US008407376B2

(12) United States Patent
Heidelberger et al.

(10) Patent No.: US 8,407,376 B2
(45) Date of Patent: Mar. 26, 2013

(54) RECORDING A COMMUNICATION PATTERN AND REPLAYING MESSAGES IN A PARALLEL COMPUTING SYSTEM

(75) Inventors: Philip Heidelberger, Cortlandt Manor, NY (US); Sameer Kumar, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 12/500,715

(22) Filed: Jul. 10, 2009

(65) Prior Publication Data

US 2011/0010471 A1  Jan. 13, 2011

(51) Int. Cl.
*G06F 13/28* (2006.01)

(52) U.S. Cl. .......................................... 710/22
(58) Field of Classification Search ...................... 710/22
See application file for complete search history.

(56) References Cited

U.S. PATENT DOCUMENTS

| | | | |
|---|---|---|---|
| 5,938,775 A | | 8/1999 | Damani et al. |
| 6,023,732 A | * | 2/2000 | Moh et al. ..................... 709/232 |
| 6,049,838 A | | 4/2000 | Miller et al. |
| 6,889,266 B1 | * | 5/2005 | Stadler ............................ 710/22 |
| 6,898,791 B1 | | 5/2005 | Chandy et al. |
| 7,216,046 B2 | | 5/2007 | Agoston et al. |
| 2009/0003344 A1 | | 1/2009 | Kumar |
| 2009/0006296 A1 | | 1/2009 | Chen et al. |
| 2009/0006808 A1 | | 1/2009 | Blumrich et al. |
| 2009/0006810 A1 | | 1/2009 | Almasi et al. |
| 2009/0007141 A1 | | 1/2009 | Blocksome et al. |

OTHER PUBLICATIONS

Bhargavan et al., Secure Sessions for Web Services, ACM Transactions on Information and System Security, vol. 10, No. 2, Article 8, Publication date: May 2007.

Elnozahy et al., A Survey of Rollback-Recovery Protocols in Message-Passing Systems, ACM Computing Surveys, vol. 34, No. 3, Sep. 2002, pp. 375-408.
MPI_Send_init, http://www.mcs.anl.gov/research/projects/mpi/www/www3/MPI_Send_init.html, Jul. 7, 2009.
MPI_Start, http://www.mcs.anl.gov/research/projects/mpi/www/www3/MPI_Start.html, Jul. 7, 2009.
Kumar et al., The Deep Computing Messaging Framework: Generalized Scalable Message Passing on the Blue Gene/P Supercomputer, Pin Zhou (Ed.): Proceedings of the 22nd Annual International Conference on Supercomputing, ICS 2008, Island of Kos, Greece, Jun. 7-12, 2008. ACM 2008, ISBN 978-1-60558-158-3.

* cited by examiner

*Primary Examiner* — Idriss N Alrobaye
*Assistant Examiner* — Brooke Taylor
(74) *Attorney, Agent, or Firm* — Ryan, Mason & Lewis, LLP

(57) ABSTRACT

A parallel computer system includes a plurality of compute nodes. Each of the compute nodes includes at least one processor, at least one memory, and a direct memory address engine coupled to the at least one processor and the at least one memory. The system also includes a network interconnecting the plurality of compute nodes. The network operates a global message-passing application for performing communications across the network. Local instances of the global message-passing application operate at each of the compute nodes to carry out local processing operations independent of processing operations carried out at another one of the compute nodes. The direct memory address engines are configured to interact with the local instances of the global message-passing application via injection FIFO metadata describing an injection FIFO in a corresponding one of the memories. The local instances of the global message passing application are configured to record, in the injection FIFO in the corresponding one of the memories, message descriptors associated with messages of an arbitrary communication pattern in an iteration of an executing application program. The local instances of the global message passing application are configured to replay the message descriptors during a subsequent iteration of the executing application program.

25 Claims, 11 Drawing Sheets

*FIG. 3*

310 — INJECTION FIFO METADATA

| | |
|---|---|
| START ADDRESS (RW) | 311 |
| END ADDRESS (RW) | 312 |
| PRODUCER ADDRESS (RW) | 313 |
| CONSUMER ADDRESS (RW) | 314 |
| IS_EMPTY BIT (R) | 315 |
| IS_FULL BIT (R) | 316 |
| WAS_THRESHOLD_CROSSED BIT (R) | 317 |
| CLEAR_THRESHOLD_CROSSED BIT (W) | 318 |
| IS_ACTIVE BIT (R) | 319 |
| ACTIVATE BIT (W) | 320 |
| DEACTIVATE BIT (W) | 321 |
| ENABLE BIT (SRW) | 322 |
| PRIORITY BIT (SRW) | 323 |
| THRESHOLD VALUE (SRW) | 324 |
| SERVICE_QUANTUM VALUE (SRW) | 325 |
| NETWORK_RESOURCES BITMASK (SRW) | 326 |
| THRESHOLD_INTERRUPT BIT (SRW) | 327 |

PHASE 0:

PHASE 1:

PHASE 2:

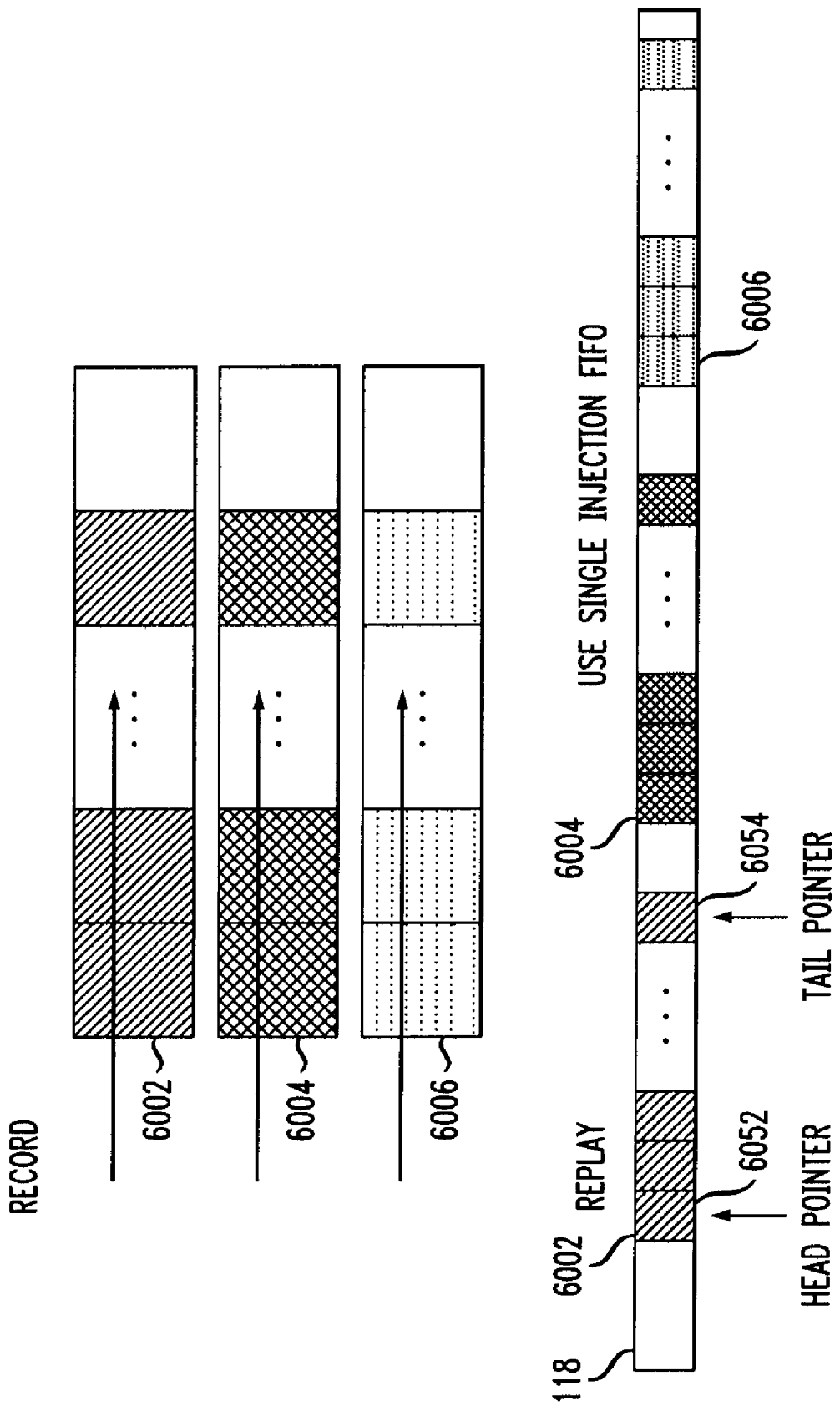

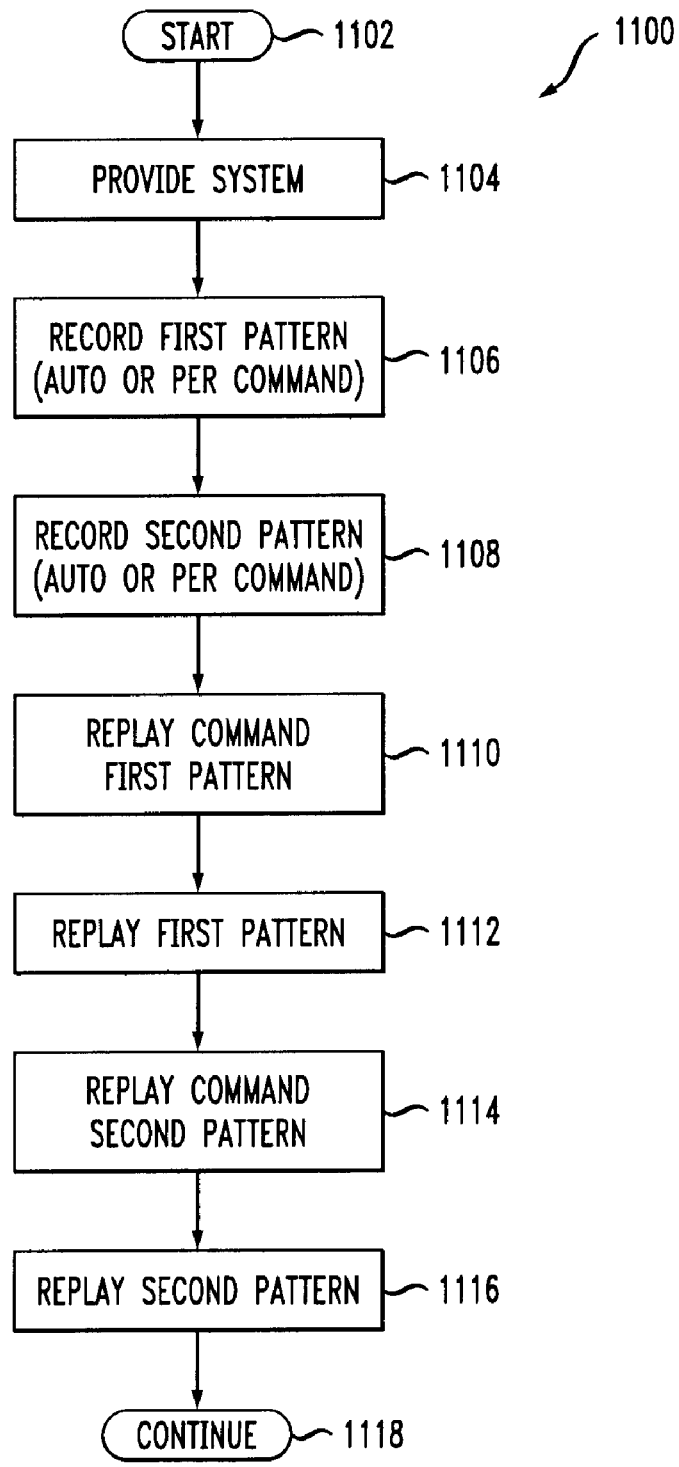

RECORDING A COMMUNICATION PATTERN AND REPLAYING MESSAGES IN A PARALLEL COMPUTING SYSTEM

FIELD OF THE INVENTION

The present invention generally relates to the electrical, electronic, and computer arts, and, more particularly, to parallel computing systems.

BACKGROUND OF THE INVENTION

In parallel computing, many calculations are carried out simultaneously, taking advantage of the fact that large problems can often be divided into smaller ones, which can then be solved concurrently. Direct memory address (DMA) is employed in many parallel computing systems. In some cases, parallel computing systems include a plurality of compute nodes interconnected by a network. Communication between the different compute nodes is a significant issue.

SUMMARY OF THE INVENTION

Principles of the present invention provide techniques for recording a communication pattern and replaying messages in a parallel computing system.

In an exemplary embodiment, according to one aspect of the invention, a parallel computer system includes a plurality of compute nodes. Each of the compute nodes includes at least one processor, at least one memory, and a direct memory address engine coupled to the at least one processor and the at least one memory. The system also includes a network interconnecting the plurality of compute nodes. The network operates a global message-passing application for performing communications across the network. Local instances of the global message-passing application operate at each of the compute nodes to carry out local processing operations independent of processing operations carried out at another one of the compute nodes. The direct memory address engines are configured to interact with the local instances of the global message-passing application via injection FIFO metadata describing an injection FIFO in a corresponding one of the memories. The local instances of the global message passing application are configured to record, in the injection FIFO in the corresponding one of the memories, message descriptors associated with messages of an arbitrary communication pattern in an iteration of an executing application program. The local instances of the global message passing application are configured to replay the message descriptors during a subsequent iteration of the executing application program.

In another aspect, a method is provided, including the steps of providing a parallel computer system of the kind described; recording, with local instances of the global message passing application, in the injection FIFO in the corresponding one of the memories, message descriptors associated with messages of an arbitrary communication pattern in an iteration of an executing application program; and replaying the message descriptors, with the local instances of the global message passing application, during a subsequent iteration of the executing application program.

One or more embodiments of the invention or elements thereof can be implemented in the form of a computer product including a computer readable storage medium with computer usable program code for performing, or facilitating performance of, some or all of the method steps indicated. Furthermore, one or more embodiments of the invention or elements thereof can be implemented in the form of means for carrying out, or facilitating carrying out, one or more of the method steps described herein; the means can include hardware module(s) or a combination of hardware and software modules implementing the specific techniques set forth herein, and the software can be stored in a computer-readable storage medium (or multiple such media).

As used herein, "facilitating" an action includes performing the action, making the action easier, helping to carry the action out, or causing the action to be performed. Thus, by way of example and not limitation, software instructions might facilitate an action carried out by one or more processors.

One or more embodiments of the invention may offer one or more of the following technical benefits:

improved programmer productivity (no need to manually set up lists of FIFOs);

performance enhancement through record and replay of messages.

These and other features, aspects and advantages of the invention will become apparent from the following detailed description of illustrative embodiments thereof, which is to be read in connection with the accompanying drawings.

BRIEF DESCRIPTION OF THE DRAWINGS

FIG. 3 shows exemplary injection FIFO metadata;

FIG. 10 shows a record and replay process, according to another aspect of the invention; and FIG. 11 is a flow chart of exemplary method steps, according to still another aspect of the invention.

DETAILED DESCRIPTION OF PREFERRED EMBODIMENTS

One or more embodiments of the invention are applicable to parallel computing systems. Non-limiting examples of such systems, used solely for purposes of illustration and not limitation, are the Blue Gene/P and Blue Gene/Q machines from International Business Machines Corporation of Armonk, N.Y., USA; refer also to US Patent Publications 2009/0006808 "Ultrascalable Petaflop Parallel Supercomputer" and 2009/0006296 "DMA Engine For Repeating Communication Patterns," the complete disclosures of both of which are expressly incorporated herein by reference in their entirety for all purposes. The complete disclosure of US Patent Publication 2009/0003344, entitled "Asynchronous Broadcast For Ordered Delivery Between Compute Nodes In A Parallel Computing System Where Packet Header Space Is Limited," is also expressly incorporated herein by reference in its entirety for all purposes.

Parallel Computer System with Direct Memory Address (DMA) Engines

Figure 1:
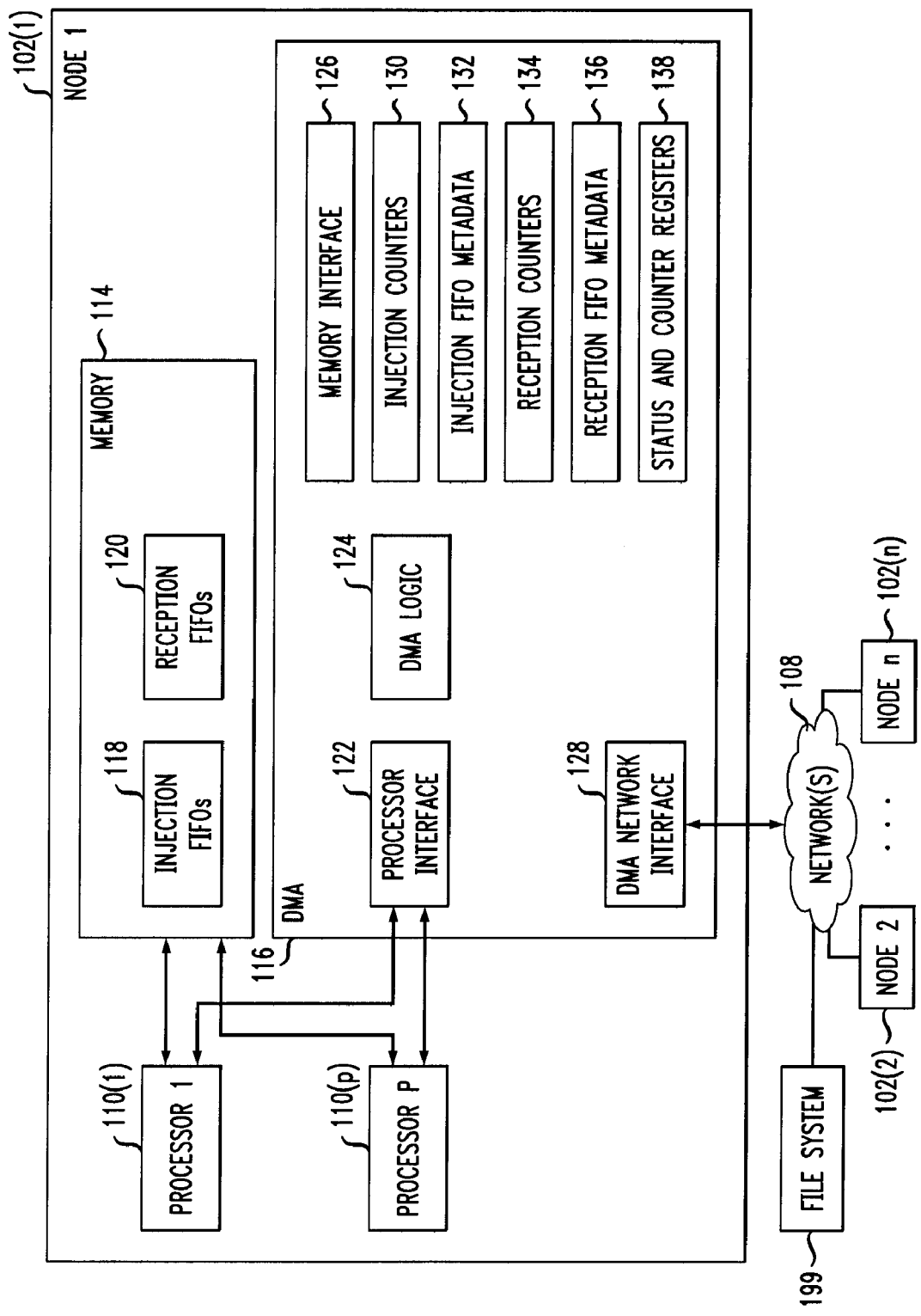
FIG. 1 shows a schematic block diagram of a parallel computer system, according to an aspect of the invention.

FIG. 1 herein is a schematic block diagram illustrating an exemplary parallel computer system 100 employing aspects of the invention. Parallel computer system 100 includes a plurality of individual compute nodes 102(1), 102(2) . . . 102(n), which may, for example, be constructed as single application specific integrated circuits (ASICs) and interconnected across network 108. FIG. 1 highlights a preferred construction of one of the compute nodes, ASIC 102(1). Each of the exemplary compute nodes (102(n)) is fabricated to integrate all the functions of a computer into a single compute ASIC to enable a dramatic reduction in node size and power consumption. In a supercomputer, or parallel computer system, the reduced node size and its lower power consumption provides for increased node density, thereby decreasing the overall cost per unit performance for the parallel computer system (100). It is to be emphasized that the configuration of FIG. 1 is exemplary and non-limiting in nature.

Compute node or ASIC 102(1) may function as both a compute node and an input/output (I/O) node in the parallel computer system 100. Compute node 102(1) includes a plurality of processors or processor cores, 110(1), . . . 110(p), but preferably four. Each of the processor cores 110 can include, form example, a "double" floating point unit, which may in turn include two coupled standard floating point units. This arrangement gives a peak performance of four floating point operations per processor core per clock cycle.

Besides the embedded processor cores 110, and floating point cores (not shown in FIG. 1), each node 102 of the parallel computer system 100 includes a DMA, or DMA engine 116 (DMA and DMA engine are used interchangeably herein), and a memory 114 such as, for example, an embedded dynamic random access memory (DRAM). DRAM 114 includes injection FIFOs 118 and reception FIFOs 120, and can be controlled, for example, by an integrated external DDR2 (double data rate synchronous dynamic random access memory interface) memory controller (not shown in FIG. 1) and DMA engine 116. DMA engine 116 includes processor interface 122, DMA logic 124, memory interface 126, DMA network interface 128, injection counters 130, injection FIFO metadata 132, reception counters 134, reception FIFO metadata 136 and status and control registers 138. The injection FIFO metadata 132 describes where in memory 114 the injection FIFOs 118 are located and the current head and tail of the FIFOs. The reception FIFO metadata 136 describes where in memory the reception FIFOs 120 are located, and the current head and tail of the FIFOs. Particularly in a system-on-a-chip implementation, the amount of logic area devoted to the DMA engine may be quite limited, and thus the number of counters may be relatively small. Effective sharing of counters between multiple messages may thus be desirable.

DMA engine 116 directly controls transfer of long messages, which long messages are typically preceded by short protocol messages deposited into reception FIFOs on a receiving node (for example, a reception FIFO 120 in memory 114 of compute node 102(2)). Through these protocol messages, the sender, source or origin compute nodes, and the receiver, target or destination compute nodes agree on which injection counter (130) and reception counter (134) identifications to use for message passing, and what the base offsets are for the messages being processed. Long message transfer may be initiated by a core processor on the sender node by placing a "put" message descriptor into an injection FIFO 118 (in memory 114), writing the injection counter base and value via writes via the DMA engine's memory interface 126, and appropriately modifying the injection FIFO metadata 132 for the injection FIFO containing that message. This includes advancing a tail pointer indicating the "last" message descriptor in the injection FIFO via a "write" to the DMA processor interface 122. DMA logic 124 reads the injection FIFO metadata 132, and recognizes which injection FIFOs have messages to be sent.

The DMA logic causes the DMA memory interface 126 to read the descriptor in an injection FIFO 118 (in memory 114). The put message descriptor includes the injection (130) and reception counter (134) identifications to be used, the message length, the initial injection and reception offsets of the message, the destination node and other network routing information. The DMA engine 116 begins fetching the message and assembling it into packets to be "put" on to the network 108. Each packet contains an offset from the reception counter 134 where the data from this packet is to be stored, and a count of how many bytes in this packet should be written. DMA engine 116 is responsible for updating this information correctly for each packet, and puts the packets into the DMA network interface 128 (when space is available), at which time the packet enters the network and is routed to the destination compute node (for example, compute node(n)).

After DMA engine 116 puts the message in the DMA network interface 128, it decrements the specified injection counter 130 by the number of bytes in the packet. Upon reaching the destination, the packet is put into the DMA network interface at that compute node (e.g., 102(n), and the target node's DMA engine "recognizes" that the packet is there. The DMA engine at the receiver or target compute node reads the reception counter identification, offset and count from the received packet, looks up the reception counter base address, writes the appropriate number of bytes starting at the base plus packet offset, and then decrements the counter value by the bytes.

If a remote get operation is used, instead of the processor on the sender node injecting a descriptor into the Injection FIFO 118, the receiver node sends a short get message (which contains a put descriptor) to the sender compute node (e.g., 102(n)), and the DMA logic at the sender compute node puts this descriptor into the Injection FIFO and advances that FIFO's data appropriately. To share a byte counter, the base address of the shared counter must be set to a value smaller than the base address of any message to be using that counter. The initial value of the counter is set to zero. The initial offset in a message descriptor is the message's starting address minus this base offset. The particular processor increments the counter value by the current message length, and in accordance with the novel operation, the processor need only know the current message length, but not the lengths of the other messages using this counter, nor the number of bytes that have already been received. The reader should note that the byte counter can be shared between messages even if the messages come from different source (sender) nodes.

Network 108 preferably displays a 10 gigabit Ethernet functionality, providing all the network link cut-through routing buffers and routing control block that allows any two nodes to communicate with low latency. The four (or "p") processor cores embedded in ASIC (node 102(1)) as shown may be utilized for message handling and computation operations. Virtual cut-through torus routing may be supported in a hardware block, which is integrated into the compute nodes 102 to allow for the elimination of the network adapter, typically required in conventional parallel computer system operation. Preferably, a virtual channel routing network is supported with two (2) dynamic and two (2) deterministic channels.

The same compute node ASIC construction 102 can also be used as an I/O node, which is associated with a subset of the compute nodes (e.g., 16, 32, 64, or 128 compute nodes), for handling fileserver communication and I/O operations. In some embodiments, the only difference between an I/O compute node and a computation compute node is that an I/O node enables and uses an external network interface, such as the 10 Gigabit Ethernet. While the compute nodes may have the integrated 10 gigabit Ethernet (they share a common ASIC), for purposes of discussion, the 10 gigabit Ethernet interface is enabled at the I/O nodes only.

The network 108 of interconnected compute nodes 102 effectively operates a global message-passing application for performing communications across the network, in that each of the compute nodes 102 includes one or more individual processors 110 with memories which run local instances of the global message-passing application. The nodes 102 may be connected by multiple networks; for example, torus network 108, a collective network (not shown), and a global asynchronous network (not shown), as known from US Patent Publication 2009/0006296.

Figure 2:
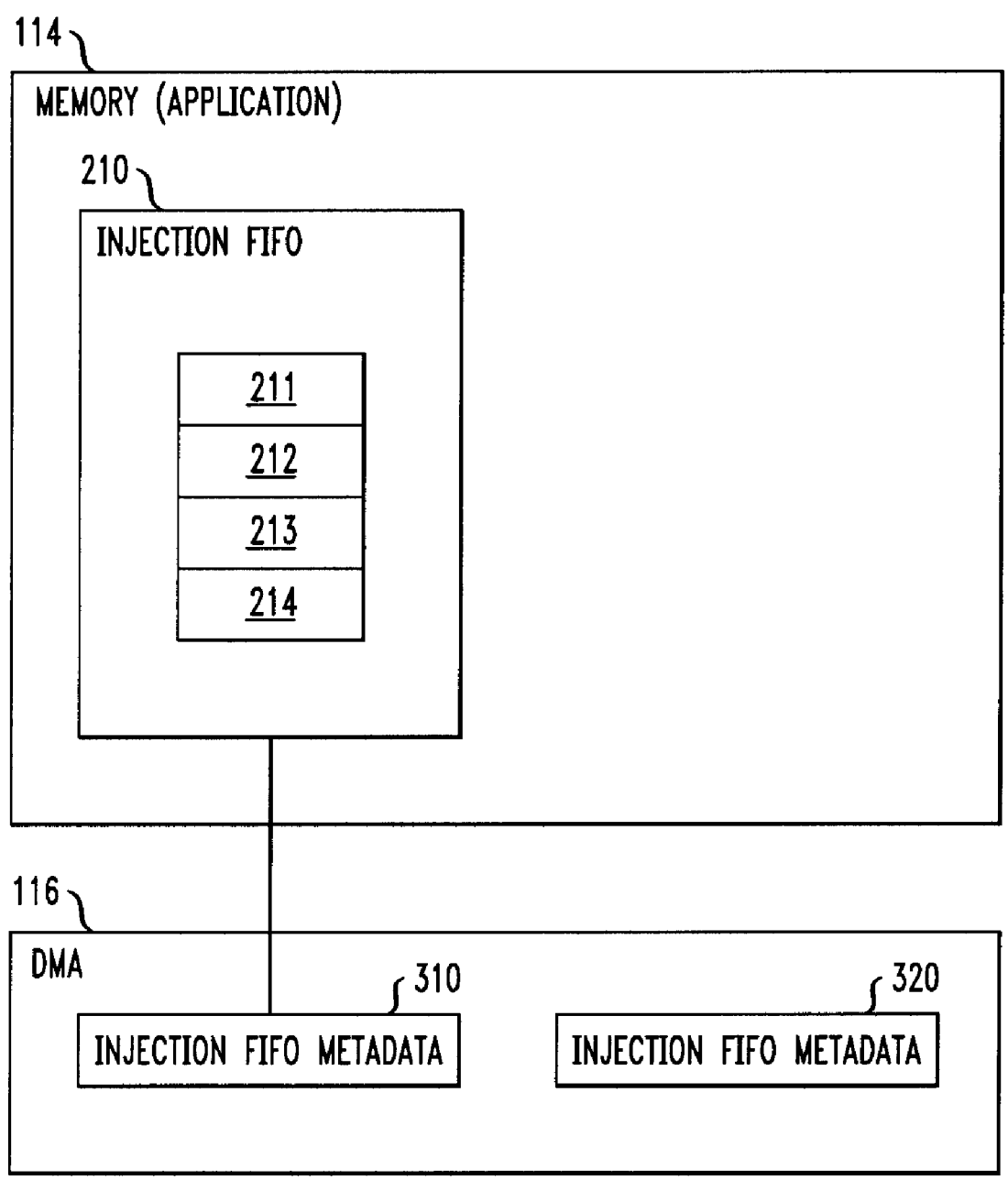
FIG. 2 is a schematic diagram illustrating one embodiment of a DMA engine of the system of FIG. 1.

In FIG. 2, the ejection FIFO Metadata 132 of the DMA engine 116 of node 102(1) of a parallel computer system 100 (as seen in FIG. 1) is illustrated as two pieces of injection FIFO metadata 310, 320, where each piece can describe an injection FIFO set aside for the local instance of the message-passing application operating at the compute node comprising same. The injection FIFO metadata, 310, 320, accommodates the DMA engine operation, and therefore, the global message-passing network operation. Injection FIFO metadata 310 describes the injection FIFO 210 of memory 114, but injection FIFO metadata 320 as shown in FIG. 2 has not been configured in view of the fact that there is no injection FIFO associated with it seen in memory 114 (the way that the presence of injection FIFO 210 can be attributed to injection FIFO metadata 310). That is, injection FIFO metadata 320 has not been configured by the message-passing application with an injection FIFO, such as injection FIFO 210 associated with injection FIFO metadata 310, as mentioned.

FIG. 3 is a schematic diagram illustrating a possible form of injection FIFO metadata 310 (introduced with reference to FIG. 2), for a single injection FIFO 210 and its implementation as a circular queue buffer. Injection FIFO metadata 310 contains various fields 311-327 for controlling the injection FIFO 210 and supporting the message-passing operation within a parallel computer system. Any of fields 311-327 marked (R) are readable only, and any marked (W) are writable. Any of fields marked (S) are only accessible via protected system calls, and not directly via the message-passing or communication application. For each bit field, for example, message field 315 as shown in FIG. 3, a corresponding bit from the metadata of 32 injection FIFOs is collected into a single 32-bit word of metadata for more efficient control of multiple injection FIFOs. The fields 311-327 are further described below.

The injection FIFOs 210 are circular buffers within the application memory 114, and define a start address 311 and an end address 312 of a buffer. The injection FIFOs may be thought of as a producer-consumer queue with the communication software application (for example, the global message-passing application) acting as the producer, and the DMA network interface acting as the consumer. The producer queue injection FIFO further includes a producer address 313 (producer queue address), and the consumer address 314 (consumer queue address). In operation, a communication software application injects a message by incrementing the producer address 313. When space in the network is available, the DMA engine 116 fetches the message descriptor at the consumer address 314, and injects the corresponding message into the network (via DMA network interface 128). The DMA engine 116 then increments the consumer address 314.

The DMA engine 116 preferably provides one hundred twenty eight injection FIFO descriptors, and, therefore, up to one hundred twenty eight active injection FIFOs. With respect to multicore node operation, this novel feature allows for each core 110 to have its own injection FIFO, and in some cases, multiple injection FIFOs. Such operation improves performance of a large message by splitting the large message across multiple injection FIFOs. A "network_resources" bitmask 326, shown in FIG. 3 within injection FIFO metadata 310, specifies the network resources available to messages in the injection FIFO. Network resources such as "network_resources" bitmask 326 include operation in view of network priorities. The resources include network buffers and network links, where splitting network resources across multiple injection FIFOs allows a communication (message-passing) software application to better control use of network resources.

Injection FIFO metadata 310 may further include an "is_empty" bit 315, which allows a communication application to efficiently determine if all the message descriptors in the FIFO have been sent. Put another way, in order to determine if there is work to be done by the DMA engine, the "is_empty" bit 315 represents whether there are additional, or any, message descriptors to be sent. The injection FIFO metadata 310 may further include an "is_full" bit 316, which is used to allow the communication application to efficiently determine if there is room in the descriptor for injecting additional message descriptors. That is, the "is_full" bit 316 is used by the local instance of the message passing application to determine whether there are more message descriptors (load) to be operated upon (the producer of the injection FIFO). A "was_threshold_crossed" bit 317 records if the free space in the injection FIFO was ever below the threshold value 324. "Was_threshold_crossed" bit 317 can be cleared using the "clear_threshold_crossed" bit 318, and a "threshold interrupt" bit 327 supports determining whether crossing the threshold also causes an interrupt for the processor cores 110 of a compute node 102.

In the injection FIFO metadata 310, an enable bit 322 is included for determining whether the injection FIFO metadata is available for application use. If the enable bit 322 is not set, the descriptor is ignored by the DMA engine. If priority bit 323 is set, the descriptor is served by the DMA engine more frequently than descriptors without this bit set. "Service_quantum" value 325 is included for determining how many message payload bytes should be sent from this injection FIFO metadata by the DMA engine, assuming room in the network is available, before serving another injection FIFO metadata. The "is_active" bit 319 is used by the application to determine if the descriptor is active.

In some applications, there are multiple communication patterns that may be active during different parts of the application. Each such pattern may be described by the message descriptors within an injection FIFO. If the number of such patterns is greater than the number of injection FIFOs supported by the injection FIFO metadata, he DMA can be reprogrammed so that injection FIFO metadata can be switched with very low overhead from one communication pattern to another. The DMA engine 116 only serves the injection FIFO metadata if it is active; the injection FIFO metadata is activated by the communication application (for example, the global message-passing application) using the activate bit 320. The communication application de-activates the descriptor using the de-activate bit 321. In this case, the application uses the "is_empty" bit 315 to see if injection FIFO metadata is finished as to its current injection FIFO and is available for a new injection FIFO. If the "is_empty" bit is set, the application may de-activate the injection FIFO using deactivate bit 321. This deactivation ensures that the DMA engine does not act on inconsistent information in the injection FIFO metadata while it is being reprogrammed by the application from one injection FIFO to another. To reprogram the injection FIFO metadata, the application then writes in the new injection FIFO metadata including the start, end, producer and consumer addresses. The application then re-activates the injection FIFO metadata using the bit 320. In this way, only the injection FIFO metadata is reprogrammed to point to a different injection FIFO in memory 114; the message descriptors in these different injection FIFOs need not be reprogrammed.

Message Passing Interface and "Multisend"

Parallel computer applications often use message passing to communicate between processors (or between multi-processor nodes). Message passing utilities such as the Message Passing Interface (MPI) support two types of communication: point-to-point and collective. In point-to-point messaging a processor sends a message to another processor that is ready to receive it. In a collective communication operation, however, many processors participate together in the communication operation. Examples of collective operations are broadcast, barrier, all-to-all, and the like.

Each collective communication operation should preferably to be optimized to maximize performance. The known methodologies implement the collective communication operations through separate calls and in a separate software stack. Most typical implementations are specific to hardware or part of specific languages or runtimes. Such implementation methods result in high development and maintenance overheads. In addition, in known methodologies, this type of implementation is repeated for every new version of a parallel computer. For different parallel computers or different versions of a parallel computer, several different parallel programming paradigms need to be supported and each of them may define its own collective primitives. Each of these typically requires separate implementations and optimized runtimes.

US Patent Publication 2009/0006810, entitled "Mechanism To Support Generic Collective Communication Across A Variety Of Programming Models," the complete disclosure of which is expressly incorporated herein by reference in its entirety for all purposes, describes a system and method to modularize and support a plurality of functionalities and sub-functionalities in providing a collective framework that can be used across different parallel computers that use different message passing programming languages or models. Modules or functionalities of the collective framework may include: 1) programming language semantics, which handles sub-functionalities such as collective API (application programming interface) and synchronization modes; 2) data transfer functionality; 3) collective operations and mechanisms functionality, which may include sub-functionalities such as phase-by-phase traversal of virtual and physical topologies, and network optimizations; 4) specific optimization functionalities such as pipelining, phase independence, and multi-color routes.

Figure 4:
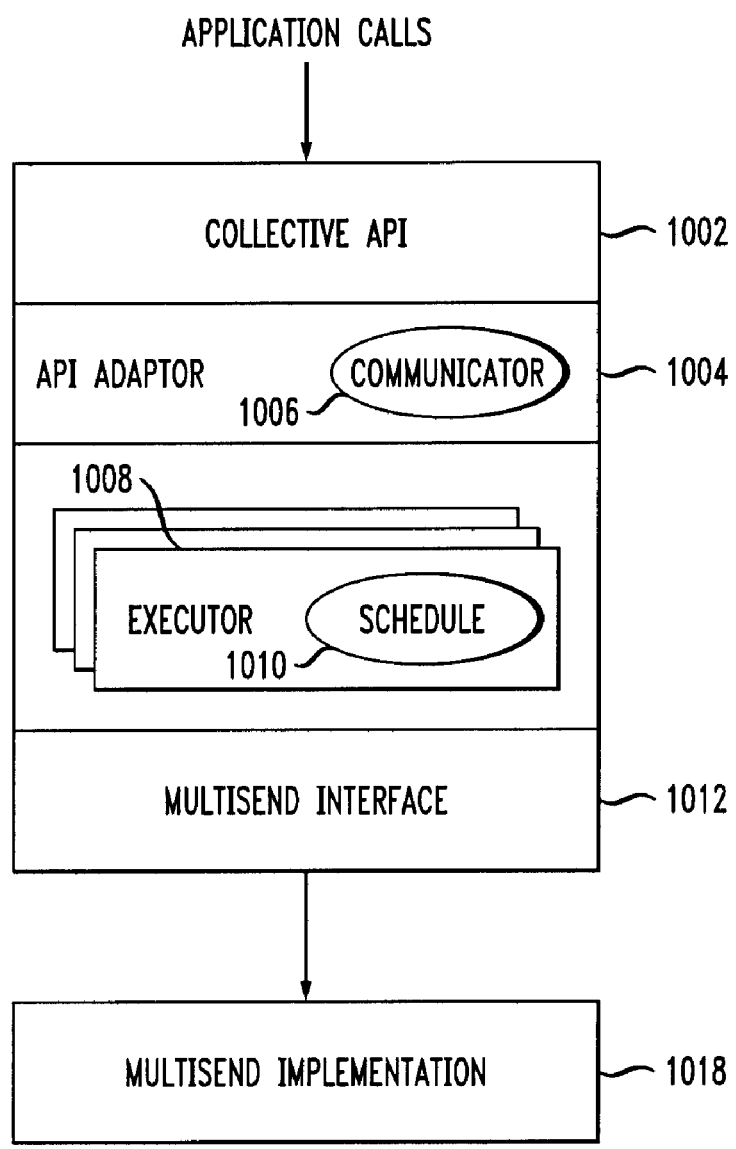
FIG. 4 illustrates a set of components for supporting collective communications on a plurality of processors.

FIG. 4 illustrates a set of components that supports a common paradigm. A common paradigm may be in a form of a programming language, methodology, memory model, synchronization model, methodology to formulate a software module, etc. The set of components that enables the common paradigm in one embodiment is extendable to many other programming paradigms on multiple parallel architectures. The components in one embodiment may be implemented as class and/or template libraries.

A schedule 1010, for instance, handles a functionality of collective operations and mechanisms. A schedule 1010 includes a set of steps in the collective mechanism that executes a collective operation. Collective operation may be a call in MPI, such as "broadcast," "allreduce," and other calls. Collective mechanism describes how the collective is done; for example, via a spanning tree broadcast mechanism. A schedule 1010 traverses graphs and topologies of nodes in the parallel computer. The schedule may be generated for each node in the collective operation. The schedule may depend on the rank of the node and the rank of the root of the collective. Briefly, ranks identify processes participating in the message passing operation.

A schedule 1010 may split a collective operation into phases. For example, a broadcast can be done through a spanning tree schedule where in each phase a message is sent from one node to the next level of nodes in the spanning tree. In each phase, a schedule 1010 lists sources that will send a message to a processor and a list of tasks that need to be performed in that phase. Examples of tasks may be sending messages or performing arithmetic operations. A schedule may be implemented as a C++ class, which may be called by an executor. An executor 1008 then performs the list of tasks specified by the schedule 1010.

An executor 1008 may handle functionalities for specific optimizations such as pipelining, phase independence and multi-color routes, but not limited to only those optimizations. An executor 1008 may query a schedule on the list of tasks and execute the list of tasks returned by the schedule. An executor 108 may also handle pipelining and specific optimizations for each collective operation. Typically, each collective operation is assigned one executor.

A multisend interface 1012 provides an interface to "multisend." The collective framework may call the multisend interface 1012. The interface may be implemented on a specific architecture, for example, the BlueGene/P "multisend" implementation 1018. For example, in the Blue Gene/P product there may be provided a "multisend" implementation to allow the collective framework to be available on Blue Gene/P. It is to be emphasized that references to specific products such as Blue Gene/P are for purposes of example and illustration, and not limitation.

A "multisend" is a message passing backbone of a collective framework that provides data transfer functionalities. "Multisend" functionality allows sending many messages at the same time, each message or a group of messages identified by a connection identifier. "Multisend" provides connection functionalities for a distinct stream of data. It is typically a one to many or even many to many message passing event. "Multisend" functionality also allows an application to multiplex data on this connection identifier.

In some instances, "multisend" provides point-to-point message passing capabilities with many messages being sent. In such cases, the data is only sent between a pair of processors. The receiving processor needing to process the message processes the message and chooses to forward it only on a different "multisend" call. Thus, in some instances of "multisend" functionality, data is not forwarded automatically. In addition, connections are managed externally and no communicators are required. That is, in some instances, "multisend" is independent of communicators, as it may not require a group or communicator to be set up before the "multisend" is called. A call to "multisend" lists all the processors that need to participate.

Such implementation of a "multisend" functionality provides a good match for massive parallel computer system (e.g., BlueGene/P) hardware or other architectures with slow cores because the message posting and startup overheads are amortized across many messages. Multisend interface 1012 allows a code implementing collective operations to be device independent. Each "multisend" may be a phase of a given collective operation.

A processor may multicast a message to many other destinations in a "multisend" call. For example, a processor of rank 0 can multicast data to processors of ranks 10, 20, 30, 40 in one call. The data from the processor of rank 0 is then received by processors of ranks 10, 20, 30, 40 in their respective local buffers on completion of the "multisend" call. On the Blue Gene/P torus network described above and in US Patent Publication 2009/0006296, a "multisend" can be used to send a deposit bit to destinations along a dimension of a torus. For example, a processor can make a deposit bit "multisend" call to all its X neighbors on the torus. No predetermined groups are needed for the "multisend" call. A processor can issue "multisends" to any destinations.

A "multisend," in some instances, communicates to multiple nodes via a single message request. A send mechanism may involve sending data originating from at least one node to one or more destinations, in which the data from different sources is distinguished at destinations using a tuple (a sequence or ordered list of finite length) that includes at least a stream or connection identifier. The tuple may include <source, destination, connection identifier>. The multisend interface at the destination passes the data using this tuple to the schedule and/or executor waiting for that data.

When several processors issue "multisend" calls to the same destination processor, that destination processor would typically need to manage these different streams of data. In one embodiment, each node keeps a connection list and if the different sources send data on different connections, the data can be distinguished from one and another using the connection list and identifiers. Some instances use a connection manager component to choose the connections for each "multisend" call. A connection manager in one embodiment controls a connection identifier for each "multisend" operation. For example, many classes of a collective operation with the same schedule and executor can overlap with each other with different connection identifiers generated by the connection manager. A connection manager may maintain a list of available connections between a pair of processors and hand each "multisend" call an available connection. When all connections are in use, a "multisend" call can wait for a connection to become available. Connections are identified by connection identifiers in some cases.

A language adaptor 1004 interfaces the collective framework to a programming language. For example, a language adaptor such as for a message passing interface (MPI) has a communicator component 1006. Briefly, an MPI communicator is an object with a number of attributes and rules that govern its creation, use, and destruction. The communicator determines the scope and the "communication universe" in which a point-to-point or collective operation is to operate. Each communicator contains a group of valid participants and the source and destination of a message is identified by process rank within that group. Communicators are dynamic, that is, they can be created and destroyed during program execution. A language adaptor may also define an API 1004, which is suitable for that programming language. The API for Unified Parallel C (UPC) collectives is likely to be different from MPI collectives, for example.

Each application or programming language may implement a collective API 1002 to invoke or call collective operation functions. A user application for example implemented in that application programming language then may make the appropriate function calls for the collective operations. Collective operations may be then performed via an API adaptor 1004 using its internal components such as an MPI communicator 1006 for MPI in addition to the components in the collective framework, such as schedules, executors, "multisends," and connection managers.

Once all components have been implemented, only the language adaptor typically needs to be different for each programming language. Thus, all components except for the language adaptor may be reused across different processors on multiple parallel computers, even on those that use different programming languages or models. Thus, some instances abstract collective communication into components, and is general and applicable to most parallel computer hardware and most programming languages, providing a "program once and use at many scenarios" paradigm.

The common paradigm for collective operations in one or more instances supports various semantics, mechanisms, optimizations, and data transfer in effecting collective operations. In a collective communication operation, a group of processors (either from a predetermined communicator or on the fly) participate to carry out a global operation where each of them either receives data or contributes to that operation.

Semantics

The different programming languages have their own semantics with regard to collectives. Non-limiting illustrative examples follow of semantics that may be supported in the framework.

1. Synchrony Vs. Asynchrony:

In a synchronous collective operation all processors have to reach the collective before any data movement happens on the network. For example, all processors need to make the collective API or function call before any data movement happens on the network. Synchronous collectives also ensure that all processors are participating in one or more collective operations that can be determined locally. In an asynchronous collective operation, there are no such restrictions and processors can start sending data as soon as they reach the collective operation. With asynchronous collective operations several collectives can be happening simultaneously at the same time.

2. Blocking Vs. Non-Blocking:

With blocking collectives the processor blocks on the collective and hence can process the messages for the collective as soon as they come in. In case of a reduce operation the processor can also perform arithmetic. With a non-blocking collective the processor initiates the collective and periodically polls the messaging software to make progress on the collective. This allows the processor to compute while the collective is on the network in progress.

3. Groups Vs. on-the-Fly:

A collective operation may be performed on a pre-negotiated or pre-established group of nodes on the parallel computer network, for instance, like a communicator in MPI which is established beforehand. In some programming paradigms a collective operation can happen on the fly where an incoming message carries enough information to build the group for that collective operation on arrival.

4. Collective API:

Each programming language may choose to define its own collective Application Programmer Interface.

Collective Mechanism

A collective mechanism is a set of steps to perform a specific collective operation. It usually involves a group of processors interacting with each other in a specific order forming a virtual-topology. The virtual topology can then be aligned to the physical-topology of the communication network inter-connecting the processors. A schedule functionality shown in FIG. 4 may provide this functionality.

Non-limiting illustrative examples follow of collective operations that may be supported in the framework.

1. Broadcast:

A broadcast is defined by a root sending a message to a group of processors. The semantics of the broadcast are defined by an individual programming language. A language adaptor interfaces the semantics that are specific to the individual programming language to the generic collective framework.

2. Barrier:

In a barrier operation a processor leaves the barrier only after all the participating processors have come to the barrier.

3. Reduce:

In a reduce operation several nodes contribute data to be globally summed. The output of the reduction is returned on the root.

4. All-Reduce:

An all-reduce is similar to the reduce operation, but the output is returned on all the nodes. In some cases, an all-reduce can be designed as a reduce followed by a broadcast.

5. All-to-All:

Each node sends a different message to every other node.

Specific Optimizations

For each collective operation there may be many specific optimizations that are exclusive to that operation. Examples of optimizations that may be supported include but are not limited to pipelining, multi-color collectives, and phase independence.

Pipelining optimization can be applied to broadcast, reduce and all-reduce collectives. Here the collective is performed in small chunks and moved to intermediate nodes while the starting nodes work on the next chunk.

In a multi-color collective, data moves along multiple edge-disjoint routes of a dense interconnection network. A collective operation can be parallelized across the different independent routes. Multi color collective may be supported by the framework. An example of a multi-color collective may include, but is not limited to, multi color rectangular broadcast where packets can go along X+, Y+, Z, X− directions in a no-blocking manner with packets along Y+, Z+, X+, Y−. Each of these is represented by a color. Packets along one color do not block the other colors.

Phase-independence guarantees that some collective operation phases are independent. That is, the tasks in one phase are not dependent on the tasks in another phase. An executor component 1008 shown in FIG. 4 may provide the functionalities of optimization.

In a broadcast for example, the same data is sent in all phases. Each non-root node (for example, child or intermediate node of the broadcast spanning tree) receives the data once and sends data many times. Hence the data transfer operations in the different phases are independent of each other and can be done simultaneously.

Data Transfer Support

A collective framework may be network device independent. It may function with an external support for message passing for processors to communicate with each other in a collective operation. The data transfer in one embodiment may be through a published multisend interface. For instance, the collective framework may be built on top of a lower level messaging library which provides the "multisend" call implementation.

Figure 5A:
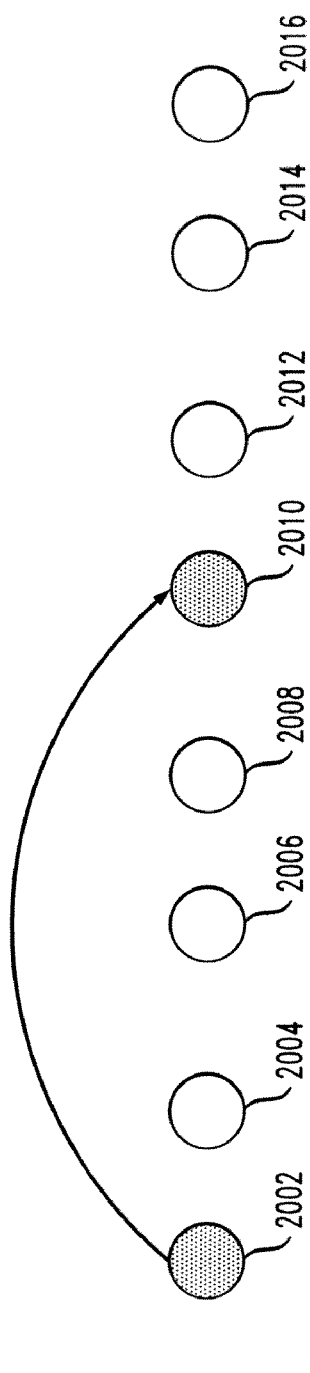
FIGS. 5A-5C show an example of a binomial broadcast schedule on eight computer nodes.
Figure 5B:
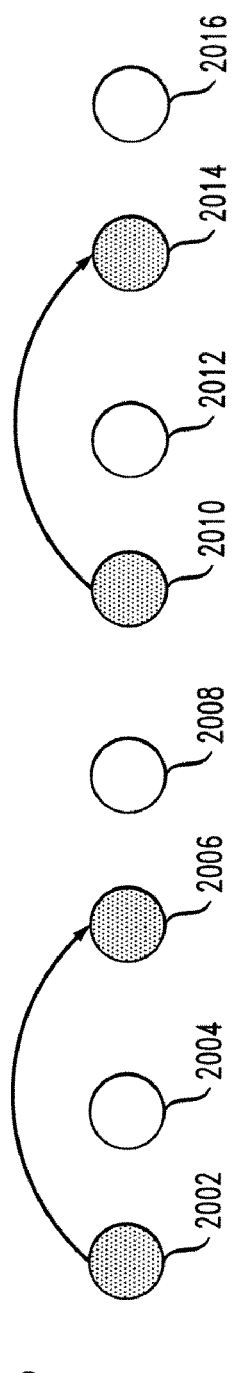
Figure 5C:
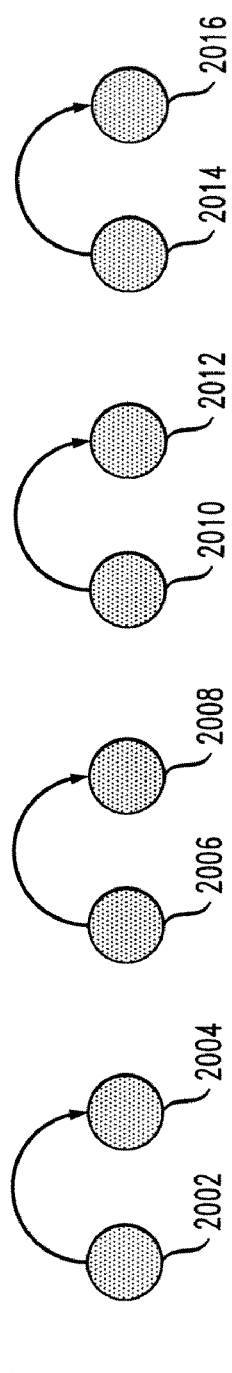

FIGS. 5A-5C show an example of a binomial broadcast schedule on eight computer nodes (2002, 2004, 2006, 2008, 2010, 2012, 2014, and 2016). Assume that processor 0 is a root processor. A schedule on processor 0 (2002) may include: at phase 0 shown in FIG. 5A, send data to processor 4 (2010); at phase 1 shown in FIG. 5B, send data to processor 2 (2006); at phase 2 shown in FIG. 5C, send data to processor 1 (2004). A schedule on processor 4 (2010) may look like: at phase 0 shown in FIG. 5A, receive data from processor 0 (2002); at phase 1 shown in FIG. 5B, send data to processor 6 (2014); at phase 2 shown in FIG. 5C, send data to processor 5 (2012). A schedule on processor 1 (2004) may include: at phase 0 shown in FIG. 5A, do nothing; at phase 1 shown in FIG. 5B, do nothing; at phase 2 shown in FIG. 5C, receive data from processor 0 (2002). A schedule on processor 2 (2006) may include: at phase 0 shown in FIG. 5A, do nothing; at phase 1 shown in FIG. 5B, receive data from processor 0 (2002); at phase 2 shown in FIG. 5C, send data to processor 3 (2008). A schedule on processor 3 (2008) may include: at phase 0 shown in FIG. 5A, do nothing; at phase 1 shown in FIG. 5B, do nothing; at phase 2 shown in FIG. 25C, receive data from processor 2 (2006). A schedule on processor 5 (2012) may include: at phase 0 shown in FIG. 5A, do nothing; at phase 1 shown in FIG. 5B, do nothing; at phase 2 shown in FIG. 5C, receive data from processor 4 (2010). A schedule on processor 6 (2014) may include: at phase 0 shown in FIG. 5A, do nothing; at phase 1 shown in FIG. 5B, receive data from processor 4 (2010); at phase 2 shown in FIG. 5C, send data to processor 7 (2016). A schedule on processor 7 (2016) may include: at phase 0 shown in FIG. 5A, do nothing; at phase 1 shown in FIG. 5B, do nothing; at phase 2 shown in FIG. 5C, receive data from processor 6 (2014).

The above schedule is initially created or agreed upon among the processors involved in the collective operation. A schedule on each participating processor has a list of tasks specific to the respective processor's rank and the root of the collective. A schedule class may be written by a programmer who is aware of the collective operation and the topology constraints.

The executor executes the schedule and performs the sending and receiving of data as directed by the schedule. The executor calls "multisend" to do the actual data movement. For example, on the root there may be three calls to "multisend" to send the data shown in FIGS. 5A-5C. Depending on how many broadcasts are in flight the connection manager generates a unique connection identifier so that the data from the different broadcasts can be distinguished. For example, a broadcast on communicator (a group of processes in MPI) could use the communicator identifier as the connection identifier so that many broadcasts of different collectives can occur together.

Figure 6:
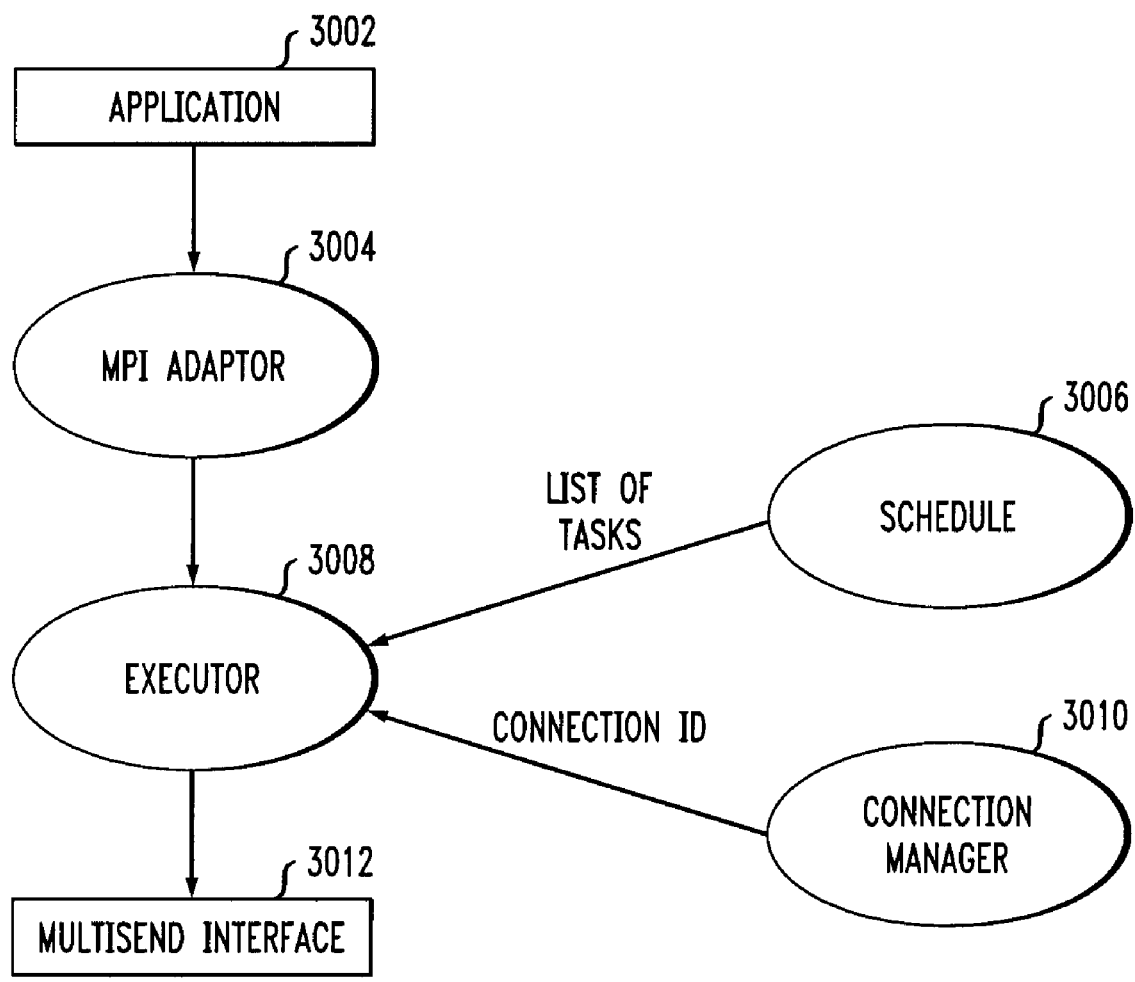
FIG. 6 is a functional view of an exemplary collective framework.

FIG. 6 is a functional view of a collective framework. An application program 3002 calls a language adaptor 3004 for the collective framework. The application program 3002 can be any program, for instance, a user application or an application that is automatically run by the processor, etc. The adaptor 3004 then creates an instance of an executor 3008 and a schedule 3006. The schedule 3006 is based on the parameters with which the application program 3002 invokes the language adaptor 3004, or specified in any other manner by the application program 3002. The executor 3008 on creation retrieves a list of tasks from the schedule 3006 and executes them by making "multisend" calls. "Multisend" calls are invoked via a multisend interface 3012. A connection manager 3010 manages a plurality of connections and provides a connection identifier associated with an available connection between a pair of processors. An executor 3008, for example, may read this list of connection identifiers to use when making "multisend" calls. In another embodiment, "multisend" calls may retrieve available connection identifiers to use when sending data from the connection manager 3010.

A common programming paradigm for performing collective operations on parallel computers may be sued, by way of example and not limitation, computers such as BlueGene/P. Examples of techniques that can be used to implement the common paradigm include but are not limited to following methods. Any other mechanism may be used to extend the collective framework of components. In a new parallel computer, a new "multisend" call may be implemented. Once that is done all the supported programming languages, i.e. for which adaptors have been designed can be supported on this platform. To support a new collective mechanism or optimization for a specific architecture a new schedule may be developed to take advantage of the new features in the architecture. To extend the framework to a new programming language, a new language adaptor may be developed. This would allow the collective calls in the programming language to use the general interfaces in the collective framework.

Deep Computing Messaging Framework

The Deep Computing Messaging Framework (DCMF) is a message passing runtime designed for the Blue Gene/P machine and similar architectures. DCMF supports several programming paradigms such as the Message Passing Interface (MPI), Aggregate Remote Memory Copy Interface (ARMCI), Charm++, and others. This support is made possible as DCMF provides an application programming interface (API) with active messages and non-blocking collectives. The DCMF runtime can be extended to other architectures through the development of architecture specific implementations of interface classes. The production DCMF runtime on Blue Gene/P takes advantage of the direct memory access (DMA) hardware to offload message passing work and achieve good overlap of computation and communication. The skilled artisan will be familiar with DCMF from "The Deep Computing Messaging Framework: Generalized Scalable Message Passing on the Blue Gene/P Supercomputer," by Sameer Kumar et al., presented at the 2008 International Conference on Supercomputing held Jun. 7-12, 2008 on the Island of Kos, Greece, and archived in the proceedings thereof, ISBN 978-1-60558-158-3. The complete contents of the aforesaid Kumar et al. paper are expressly incorporated by reference herein in their entirety for all purposes.

Figure 7:
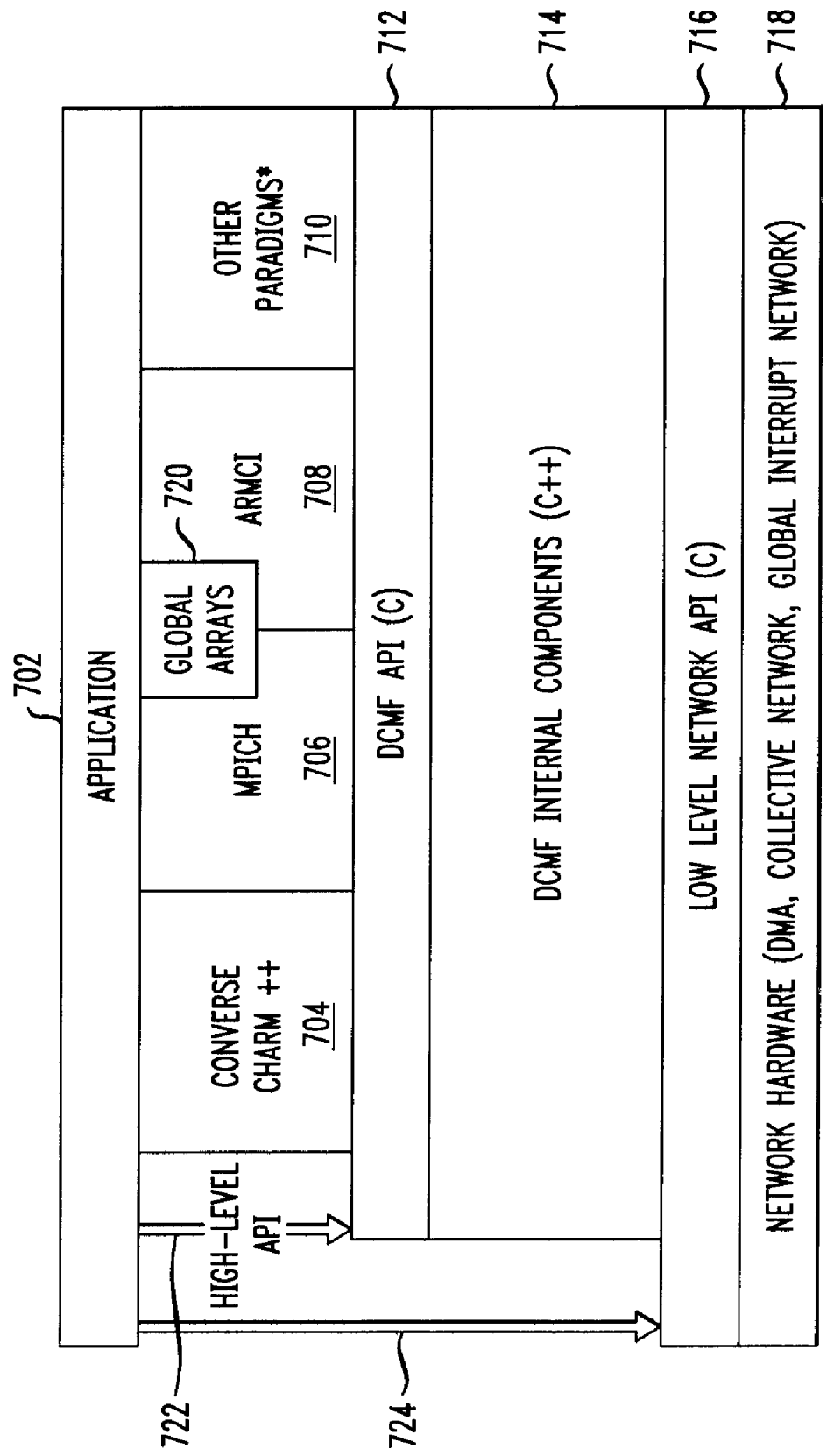
FIG. 7 shows an exemplary DCMF messaging stack.

The hierarchical structure of the DCMF runtime is presented in FIG. 7. The majority of applications 702 are expected to use MPI 706 or other common middlewares supported by the stack (e.g. ARMCI 708, Converse/Charm++ 704, or others 710). The DCMF stack builds upon and coexists with Lower Level Network APIs 716. Note that, for example, applications can simultaneously use MPI, ARMCI or Charm++, DCMF API and low-level network APIs to minimize overheads in latency critical regions, as illustrated by arrows 722, 724. The DCMF API 712 serves as the primary interface for higher level messaging systems (or custom applications). This API defines a minimal set of functions to initialize, query, configure and utilize the communication hardware 718. To ensure message progress, the DCMF API defines four possible thread levels that coincide with their MPI equivalents. Mutual exclusion is ensured for all critical sections within DCMF when the configuration requires it. The runtime system can also be configured to enable interrupts on packet arrival and have a dedicated lightweight communication thread make progress on messaging. Current MPICH implementation 706 on Blue Gene/P takes advantage of interrupt support to be fully compliant with the MPI progress semantics.

The DCMF API exposes three basic types of message passing operations: two-sided point-to-point send (DCMF Send), one-sided put (DCMF Put) and get (DCMF Get), and multi-send. All three have non-blocking semantics to facilitate overlapping of computation and communication. The user is notified of completion of communication events through callback functions.

Note global arrays 720. Internal components 714 are discussed below.

Figure 8:
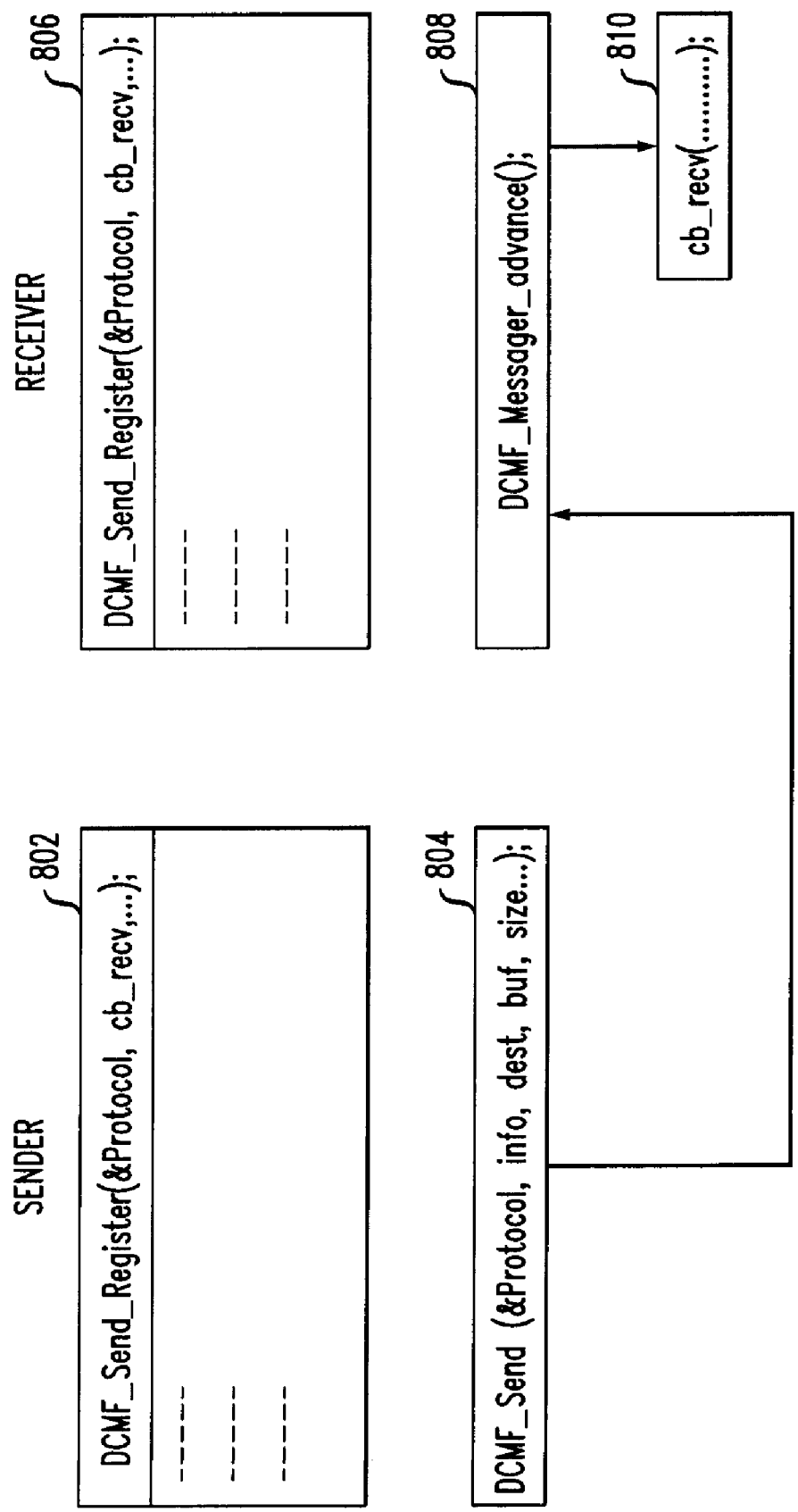
FIG. 8 shows an exemplary active message DCMF API for two-sided communication.

FIG. 8 illustrates the messaging context and active message concepts of the DCMF API. It is summarized as follows.

Multiple messaging contexts: To prepare a message transfer, the processes create messaging contexts. For two-sided communication, the context is created via the DCMF Send register( ) call in block 802. This call takes the reception callback (the cb recv 810 in FIG. 8) as an argument and associates it with a new context stored in the opaque persistent protocol object. The context can then be used for initiating subsequent send operations. Multiple contexts can coexist and be used simultaneously in the same application.

Active message model: Two-sided send operations can be initiated through the DCMF Send call as in block 804, which takes the context and the message info argument. The latter can deliver meta-data information along with the payload to enable message matching at the receiver side. When the receiver is processing the first packet of the message, the DCMF runtime invokes the reception callback associated with the context and passes it the meta-data (the info argument) and the size of the message as parameters. The callback must return a buffer where the incoming message needs to be stored.

Multisend protocol: DCMF provides a novel multisend protocol. In a multisend, many point-to-point messages to different destinations can be sent through a single operation, thus amortizing the software startup overheads. This call is of importance for low frequency core architectures. Multisend also enables network hardware specific optimizations for groups of messages (e.g., depositing packets along straight lines on the torus network). DCMF provides two flavors of the multisend protocol: multicast and many-to-many. Many-to-many allows different messages to be sent to different processes through a single API call. Multicast is a special case of many-to-many where the same message is delivered to all target processes.

Collective protocols: The API defines function prototypes for optimized non-blocking collective operations including broadcast, reduce/allreduce, barrier and all-to-all, most of which are implemented via multisend.

Receiver-side activity is shown in blocks 806, 808.

Figure 9:
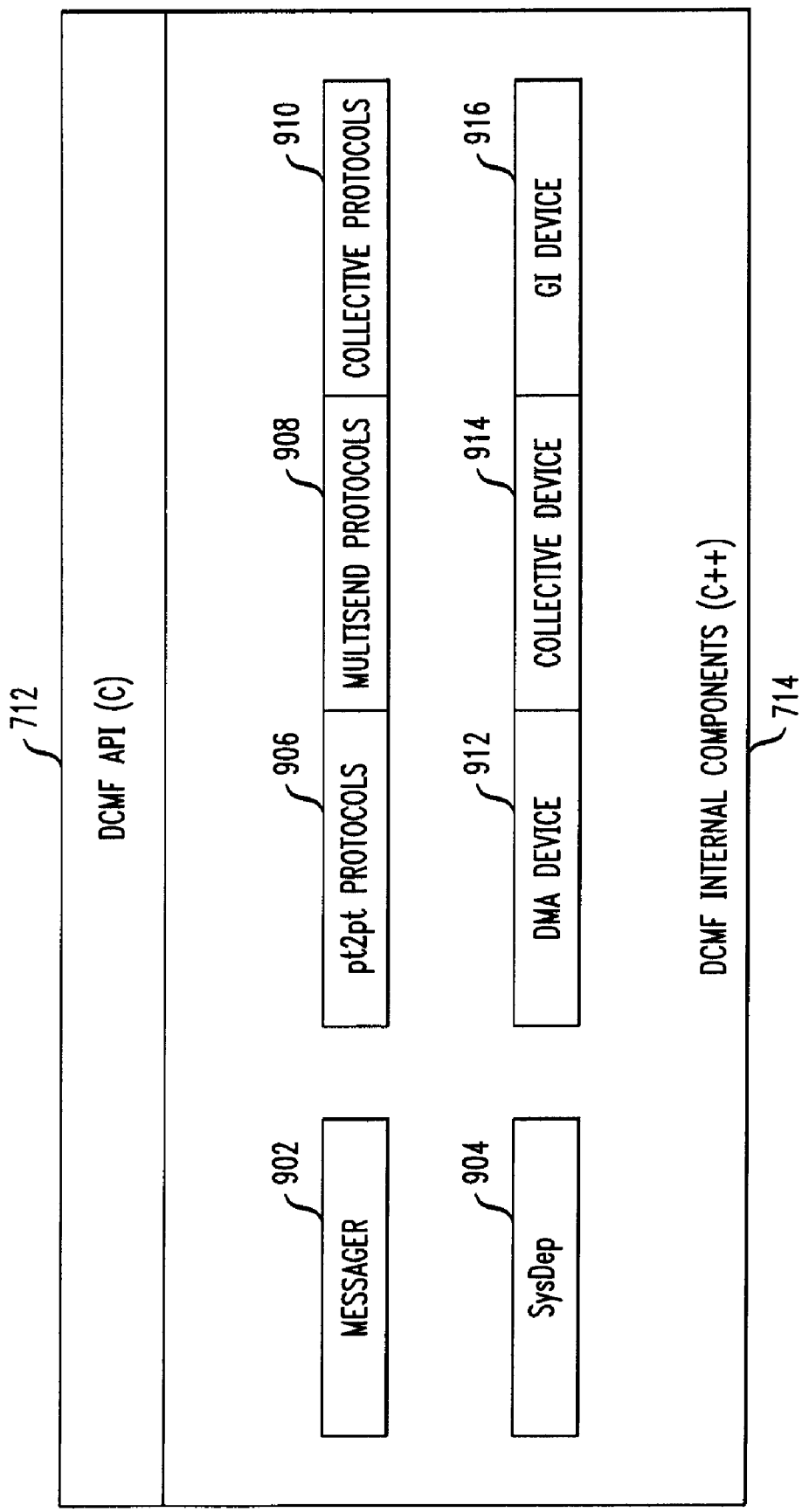
FIG. 9 shows an exemplary overview of DCMF basic components.

With reference to FIG. 9, DCMF has a component based design 714 with four abstract base components (manifested as C++ classes): device 912, 914, 916; protocol 906, 908, 910; sysdep 904 and "messager" 902. An abstract device component manages hardware and software resources associated with a corresponding network device. The abstract device layer in DCMF is important to support architectures which have several different communication networks. It also aids porting the system across various architectures. An abstract device class handles DMA resources.

The "messager" object encapsulates devices used by a particular manifestation of DCMF. Each DCMF implementation can have its own "messager" implementation that manages only those devices which exist on the particular architecture. The "messager" initializes the devices and provides a unified advance method for the higher layers to ensure message progress.

Portability of DCMF is enhanced by the sysdep component 904, which provides an abstract interface for all kernel dependent services. These services include thread-management, intra-node synchronization, personality information lookup (e.g., local rank and global torus mapping), etc.

Messaging mechanisms (like eager or rendezvous two-sided send) are implemented as protocol classes. The base protocol class provides the generic registration framework for managing multiple messaging contexts. A protocol object typically creates a few device dependent and interrelated message objects, and then posts them in the proper sequence to the appropriate device queues. Devices signal the protocol object through callbacks when posted messages complete. These callbacks may trigger creation and posting of more messages until the required data transfers have been completed.

The abstract device and protocol layers facilitate building protocol classes that use more than one device to implement complex messaging mechanisms. The component based design of DMCF results in high extendability: novel mechanisms and optimizations can easily be explored by adding new protocol objects on top of existing device and message classes.

A fully functional generic DCMF runtime is available via the sockets device, socket send protocol, and the PutOverSend and GetOverSend protocols. These components implement the core functionality of the DCMF runtime and provide a base for porting DCMF to other platforms. A new DCMF runtime implementation optimized to a particular network architecture simply needs to implement a network device and send protocol. The GetOverSend and PutOverSend protocols implement the DCMF Get and DCMF Put APIs through the DCMF Send interface. This allows the implementor to optimize a new DCMF runtime implementation in stages without dropping functionality during the bringup process. The GetOverSend and PutOverSend are intended to ease portability to new architectures and not provide optimal performance for any specific platform.

The sockets version of the DCMF runtime allows portability to generic platforms such as Linux, Mac OS X, Z/OS, or other architectures. The reason to port to the sockets platform is twofold. The first is that it is a test environment for the DCMF developers to build and test protocols and mechanisms in a portable, low cost, highly available environment. Second, users of the DCMF API who do not have ready access to Blue Gene hardware can test their application code on a non-Blue Gene environment such as workstation Linux. The sockets version of the code currently only scales to a small number (32 process ranks) of nodes, but it can be used as a proof of concept for the portability of the platform and to test the APIs.

Record and Replay

Thus, with reference again to FIG. 1, a parallel computer system, such as the Blue Gene/P machine, may use the DMA unit 116 to offload communication from the processing cores 110. In the Blue Gene/Q machine, similar functionality to DMA units 116 is provided in so-called messaging units (MU). References herein to DMA units are to be understood as also referring to messaging units or any other units with similar functionality.

Each message passing operation injects a descriptor to an injection FIFO 118 in the memory 114 (the DMA engine 116 has injection FIFO metadata 132 (e.g., head and tail pointers) which points to the descriptor in memory 116). The descriptor is then processed by the hardware of DMA 116. There is significant processing overhead associated with injecting descriptors and managing state for each message passing operation. The descriptors may, for example, tell the DMA engines 116 where to send data, set forth the buffer of the source, set forth the intent of the message (for example, is it to be deposited on a destination buffer or FIFO or is it supposed to be a "remote get" operation where the message is targeted to a totally new destination), and the like. A descriptor thus typically includes a great deal of information with respect to what a message should do.

By way of summary, to avoid burdening the processors 110 with having to manage communication, the DMA 116 is employed. The DMA unit sends data in messages. The DMA unit typically packetizes the data and pulls the appropriate data out of the memory 114. The descriptor has pointers as to where the message starts in memory 114 and how long the message is. The DMA engine 116 pulls out the data one packet at a time. A packet could be, for example, up to 512 bytes. The DMA engine puts the packets into the network 108, the packets flow through the network 108, and the packets arrive at the destination target node (for example, they could be sent from node 102(1) to destination target node 102(2)). Information in the packet header tells the DMA 116 in the receiving node (for example, node 102(2)) what to do with the packet; for example, where to put it in the memory 114 of the receiving node. A two kilobyte message could be broken up, for example, into four 512 byte packets. Thus, when sharing data among nodes 102 in a parallel computing system, there is significant overhead associated with using the descriptors to pass the messages.

In a first level of optimization, the DMA 116 offloads work from processors 110 with respect to injecting data and pulling data out of the network 108. In a second level of optimization, since even the overhead of programming the DMA can be significant for some applications on very large machines, enhancement is obtained by programming the DMA via descriptors. Thus, message passing has been enhanced, and even optimized, via the special-purpose DMA hardware, and one or more embodiments herein address programming overhead.

Very frequently, scientific applications are iterative in nature and the messages sent by the DMA in each iteration are repetitive in nature; that is, the same number of bytes are sent to the same recipients, starting in the same locations in memory on every iteration. The data in the buffers, which is sent, is different in each iteration, but often the descriptor would be identical. For example, consider a case where one megabyte of data is sent between the same points in every iteration; it starts in the same place and is to be placed in the same location. If one were to analogize to packets, it could be said that the headers were the same in each case, and only the payloads were changing. US Patent Publication 2009/0006296 shows an optimization wherein, if such a pattern is present, it is possible to set up a FIFO which contains a plurality of descriptors. The FIFO only needs to be built once. Then, to "kick off" all the messages, all that is required is to change the pointers (metadata 132) to the FIFO 118 as to where the FIFO starts, where the first descriptor is, and where the last one is. FIFO 118 is simply a location in main memory 114. Thus, with very low overhead, just by changing the pointers, one can very efficiently send the repetitive descriptors with low software overhead. In essence, the message descriptor is in the FIFO "somewhere" in memory 114, and the DMA has pointers to the FIFO, where the first descriptor is, how many descriptors there are, and where the last one is. Thus, it is built the first time and is now present in the FIFO;

all that it is necessary to do the second time is to change the pointers that tell the DMA where the messages start and stop; that is, where to point to in the FIFO to send the next message(s).

By way of review, in some applications, the communication pattern is persistent, that is, the same messages from the same buffers are sent in each iteration. For each of these messages a descriptor has to be injected into the injection FIFOs 118. Some applications can have several phases of computation and communication, which may overlap. Each of these phases may require different injection FIFOs. Injection FIFOs 118 are scarce resources.

Thus, aspects of US Patent Publication 2009/0006296 take advantage of an application where a list of DMA descriptors is built and then all that is required to optimize communication is to change the head and tail pointers.

One or more embodiments of the invention address an arbitrary online communication pattern (any application) and provide software to record the communications pattern. The pattern can be recorded, for example, by using interface calls such as the above-mentioned Deep Computing Messaging Framework (DCMF) interface calls to record the communication pattern. DCMF is, as noted, a lightweight communication framework for petascale supercomputing. It resides in the Blue Gene P messaging software stack between the systems programming interface (which interfaces with the network hardware) and the library portability layer, which in turn interfaces with the application layer. It is intended as a non-limiting example of a high-level application communication framework for handling interface calls from an application, which may be intercepted and saved as described herein. Whenever the application initiates one of the interface calls, the FIFOs that the DMA uses are saved and at a later point, when it is desired to restart the persistent communication pattern, simply call "replay" and the DMA head and tail pointers are set so that the communication pattern is replayed.

It is to be emphasized that DCMF is a non-limiting example; in other embodiments, alternatives could be employed; for example, the well-known message passing interface (MPI) standard. In some instances, use can be made of persistent communications within MPI; for example, the MPI_Start and MPI_Send_init commands.

In one or more approaches not employing one or more embodiments of the invention, a user would have to write very low level software to set up the FIFOs and change the pointers, requiring a good deal of work. Aspects of the invention include techniques to record a communications pattern including software (for example, the aforementioned message passing application) which provides needed infrastructure to save the descriptors. The "Record" feature can be turned on and off, and later, if one wishes to resend a similar message, all that is required is to employ the "replay" command. All the descriptors are saved in an appropriate buffer in memory 114, and the "replay" command deals with the low-level hardware complexities of setting the pointers to the correct location, thus drastically reducing the amount of work required. To initiate record, in some instances, explicitly put "record begin" and "record end" statements in the executing application program (e.g., scientific or financial program). In other instances, the DCMF_Multicast and DCMF_Manytomany API calls automatically record the communication patterns so no modification to the executing application program is required. Thus, depending on which high-level application communication framework is employed, it may or may not be required to modify the executing application program to start and end recording. On the other hand, the "replay" command will typically require an explicit call in the executing application program. In some instances, the MPI API call "MPI_Send_init" functions as a "record" call while the MPI API call "MPI_Start" functions as a "replay" call.

Thus, in one or more embodiments, persistent applications can be enhanced and even optimized by the use of a record-replay feature. During the "record" phase, all messages sent via the "multisend" in the DCMF API calls (such as DCMF_Multicast and DCMF_Manytomany) inject descriptors on one injection FIFO 118 and the DMA head and DMA tail pointers are saved. Successive application (e.g., scientific or financial application) iterations call "replay," to replay the saved communication operation. The replay results in the DMA head and tail pointers being set to the start of the list of saved descriptors.

"Multisend" is an interface call, described above and in US Patent Publication 2009/0006810. Examples of what "multisend" allows one to do are as follows. Suppose a node wants to broadcast the same data to a number of different nodes. The "multisend" command could specify the different nodes. In another case, it might be desired to send different data to a number of different nodes (the aforementioned "Many-to-Many" would be appropriate in this case). Aspects of the invention apply to any collection of messages that it is desired to send, including both point-to-point (unique sender sending to unique receiver) and collective communication. Thus, references to "multisend" and "Many-to-Many" are exemplary and non-limiting in nature.

A persistent ID identifies each saved communication context. A large cumulative buffer for all application contexts is allocated at application start up. One (for example) injection FIFO is located in main memory. Injection FIFO metadata on the DMA points to this buffer. When the record call is made, the communication pattern is recorded in a section of the large cumulative buffer. After the record phase, the next time the application sends the same set of messages, the replay call will set the head and tail pointers in the DMA to point to the section where that pattern was recorded. This allows a large number of communication patterns to be sent with just one hardware injection FIFO, as described below with respect to FIG. 10.

Some embodiments employ a software queue to queue up record and replay operations and allow only one persistent context to be active at a time, thus utilizing only one or two injection FIFOs. Hence, a very large number of contexts can be scheduled to be replayed one after another, allowing the application programmer flexibility to save several different overlapping phases as separate contexts, rather than being limited to the number of injection FIFOs.

The record-replay feature can also be used to optimize collective communication operations. Scientific applications use collective communication calls (for example MPI_Bcast and MPI_Allreduce commands as known to the skilled artisan) to optimize data movement on a large number of processors. On the Blue Gene/P and Blue Gene/Q machines, the DMA and Messaging units offload communication from the processor cores. On the DMA devices, communication patterns can be recorded and then replayed with very low overhead by setting the head and tail pointers in the DMA devices with extremely low overheads.

Recalling FIGS. 5A-5C, a collective communication operation is a series of phases which have to be executed in strict order. For example, in a "reduce" operation, data is summed at the leaves of a spanning tree butterfly, from where the data is sent to the intermediates nodes in the tree and finally to the root level nodes. At each level, each node has many child nodes and parent nodes in the butterfly. For short "allreduce" operations, using message passing for each of these communication operations has associated overhead.

Applications often repeat the collective operation. For short operations, it is possible to copy source buffers to persistent temporary buffers so that the collective operation is made persistent. At each level of the spanning tree, the processor waits for counters to reach zero and then initiates the send to its parent nodes in the butterfly. Each of these operations can be initiated via a direct-put to minimize processing of the messages at the cores 110. Once all the data has been completed the processor initiates the next set of replay messages by changing pointers on the DMA devices.

To enable record/replay, the application first records the communication pattern by calling a "multisend" call. The persistent "multisend" allocates a large buffer with finite pre-allocated space for each persistent index and sets up a DMA FIFO to have start and end point to this larger cumulative buffer. During the record phase, the application injects descriptors into a part of this cumulative buffer. During replay, the FIFO head and tail pointers point to the section of the cumulative buffer determined by the persistent ID. FIG. 10 illustrates this record-replay operation.

In FIG. 10, note the three communication patterns 6002 (represented by single-hatching), 6004 (represented by double-hatching), and 6006 (represented by stippling). An application, such as a scientific or financial application has, in this example, the three communication patterns 6002, 6004, 6006 that it wished to record, as indicated at the top of FIG. 10. Each pattern 6002, 6004, 6006 may be provided with its own persistent ID. Each pattern is recorded in large cumulative buffer 118, as seen at the bottom of FIG. 10. When it is desired to replay a given communication pattern (in this case, pattern 6002), the head and tail pointers in injection FIFO metadata 132 are set to point to start 6052 and end 6054 locations of pattern 6002 within cumulative injection FIFO 118. When the head and tail pointers are set as shown, the DMA engine 116 will replay pattern 6002 by pulling the descriptors of pattern 6002 from memory 118 in accordance with the pointers in metadata 132. Thus, one or more embodiments of the invention advantageously permit recording many communication patterns in one (or in alternative embodiments, two, or a small number) of injection FIFOs 118 (previous techniques have been limited in the number of communication patterns that can be replayed by the number of available injection FIFOs).

Often, applications have multiple different communication patterns, and each of the communication patterns need to be individually replayed independent of the other communication patterns. Behind the scenes, the system software (local instance of global message passing application) simply records everything into a single large buffer 118; however, it will appear to the application that the different application communication patterns 6002, 6004, 6006 are recorded separately and are each identified by a different persistent identifier. When a replay is conducted, the DMA head and tail pointers are set to the section of the large buffer 118 which corresponds to that particular communication pattern (e.g., point to pattern 6002 as seen in FIG. 10). In this scheme, the amount of communication patterns that can be recorded and replayed is arbitrarily large (say, thousands), while the number of injection FIFOs which must be used in the DMA is quite small (say, one or two). While the number of injection FIFOs and the number of parallel communication channels in a DMA is limited, in this approach, it is not limited by the number of communication patterns an application has.

One or more embodiments of the invention provide a mechanism to record a communication pattern and then replay it at a very low overhead, as well as a mechanism to extend "multisend" calls in the DCMF API to be efficiently recorded and then replayed at a later time, and/or a mechanism to record and replay several hundred communication patterns by using only one hardware injection FIFO.

Given the description thus far, it will be appreciated that, in general terms, a parallel computer system, according to an aspect of the invention, includes a plurality of compute nodes 102. Each of the compute nodes includes at least one processor 110, at least one memory, 114, and a direct memory address engine 116 coupled to the at least one processor and the at least one memory. The system also includes a network 108 interconnecting the plurality of compute nodes. The network operates a global message-passing application for performing communications across the network. In some instances, the global message-passing application is provided as a library which can be explicitly included in the application it is desired to run (e.g., financial, scientific). The application it is desired to run, in such cases, will make MPI or DCMF library calls to communicate between the different nodes 102. The libraries may reside as binary code on a disc or other persistent storage (for example, file system 199) and the application it is desired to execute links to those libraries. Local instances of the global message-passing application are loaded from the file system 199 through the network 108 and eventually end up in the main memory 114 of each node 102. The network 108 typically does not itself have an instance running on it. In some non-limiting exemplary cases, such as the aforementioned Blue Gene, communication between nodes 102 involves multiple networks 108. In some instances, a torus network is used for application data messaging, while the collective network and/or Internet are used for file input/output from system 199.

Local instances of the global message-passing application operate at each of the compute nodes 102 to carry out local processing operations independent of processing operations carried out at another one of the compute nodes. The direct memory address engines 116 are configured to interact with the local instances of the global message-passing application via injection FIFO metadata 132 describing an injection FIFO in a corresponding one of the memories 114. The local instances of the global message passing application are configured to record, in the injection FIFO 118 in the corresponding one of the memories 114, message descriptors associated with messages of an arbitrary communication pattern in an iteration of an executing application program. Note that, as used herein, including the claims, an iteration simply means an occasion to record or replay a pattern, and does not necessarily require that the executing application is implementing some kind of iterative solution technique. The local instances of the global message passing application are configured to replay the message descriptors during a subsequent iteration of the executing application program.

The message descriptors can include, for example, a destination, a source, and a message intent. The direct memory address engines 116 can be configured, for example, to assemble the messages in packet form by obtaining data from the memory 114 in accordance with the message descriptors. A given one of the local instances of the global message passing application may sometimes record the message descriptors in response to a record command in the executing application program. In other cases, a given one of the local instances of the global message passing application can be configured to automatically record the message descriptors by intercepting persistent application program interface calls of the executing application program. A given one of the local instances of the global message passing application may replay the message descriptors in response to a replay command in the executing application program.

The injection FIFO metadata may include head and tail pointers to the message descriptors in the injection FIFO, as shown in FIG. 10, and the local instances of the global message passing application may be further configured to replay the message descriptors by resetting the head and tail pointers (i.e., to point to the desired communication pattern 6002, 6004, 6006 in buffer 118.

The message descriptors may specify point-to-point and/or collective communications.

As described with respect to FIG. 10, the message descriptors may, in some cases, be first message descriptors 6002, in which case the arbitrary communication pattern is a first arbitrary communication pattern represented by a first persistent identifier. The local instances of the global message passing application may be further configured to record, in the injection FIFO 118 in the corresponding one of the memories 114, second message descriptors 6004 associated with messages of a second arbitrary communication pattern, represented by a second persistent identifier, in another iteration of the executing application program. Furthermore, the local instances of the global message passing application can be still further configured to replay the second message descriptors 6004 during another subsequent iteration of the executing application program, by resetting the injection FIFO metadata (i.e., make head and tail pointers point to 6004 instead of 6002).

In at least some embodiments of the invention, the number of arbitrary communication patterns stored in the FIFO, each represented by its own persistent identifier and available for replay, may be quite large. For example, Fast Fourier Transform (FFT) is an efficient algorithm to compute the discrete Fourier transform. In a three dimensional Fast Fourier Transform (3D-FFT) operation, Fast Fourier Transforms must be performed along the X, Y and Z dimensions. The 3D-FFT operation is often used in many scientific applications, such as in molecular dynamics (Particle Mesh Ewald computation), computational quantum chemistry and distributed Navier-Stokes. Such applications often have a pair of forward backward 3D FFT operations with four different communication phases. In at least some embodiments of the invention, these four communication phases can each be recorded with a different persistent identifier and then replayed on the same injection FIFO. In some instances, there may be at least one thousand communication patterns stored in the FIFO, each represented by its own persistent identifier and available for replay.

With reference to FIG. 11, an exemplary method 1100 begins at step 1102. In step 1104, provide a system of the kind described. In step 1106, record, with the local instances of the global message passing application, in the injection FIFO 118 in the corresponding one of the memories 114, message descriptors associated with messages of an arbitrary communication pattern in an iteration of an executing application program. Recording may be automatic or responsive to a command, as described elsewhere herein. In step 1112, replay the message descriptors, with the local instances of the global message passing application, during a subsequent iteration of the executing application program. Processing continues at step 1118.

In some cases, an additional step includes receiving a record command from the executing application program, as per the parenthetical in step 1106, wherein a given one of the local instances of the global message passing application records the message descriptors in step 1106 in response to the record command in the executing application program.

Typically, as per step 1110, a replay command is received from the executing application program, wherein a given one of the local instances of the global message passing application replays the message descriptors in step 1112 in response to the replay command in the executing application program.

As noted, in some cases, a given one of the local instances of the global message passing application records the message descriptors in step 1106 automatically by intercepting persistent application program interface calls of the executing application program, as also indicated by the parenthetical in step 1106.

In some instances, the message descriptors comprise first message descriptors, and the arbitrary communication pattern is a first arbitrary communication pattern represented by a first persistent identifier. An additional step may include recording, with a given one of the local instances of the global message passing application, in the injection FIFO in the corresponding one of the memories, second message descriptors associated with messages of a second arbitrary communication pattern, represented by a second persistent identifier, in another iteration of the executing application program, as in step 1108. Again, such recording may be automatic or responsive to an explicit command. Another additional step may include replaying, with the given one of the local instances of the global message passing application, the second message descriptors during another subsequent iteration of the executing application program, by resetting the injection FIFO metadata, as in step 1116. Step 1116 may typically be in response to a command, as in step 1114.

Exemplary Article of Manufacture Details

As will be appreciated by one skilled in the art, aspects of the present invention may be embodied as a system, method or computer program product. Aspects of the present invention preferably combine software (including firmware, resident software, micro-code, etc.) and hardware aspects. Furthermore, aspects of the present invention may take the form of a computer program product embodied in one or more computer readable medium(s) having computer readable program code embodied thereon.

A media interface, such as a diskette or CD-ROM drive, can be provided on file system 199 to interface with media.

Computer software including instructions or code for performing pertinent methodologies of the invention, as described herein, may be stored, for example, in file system 199 and, when ready to be utilized, loaded in part or in whole (for example, into memory 114) and implemented by processors 110.

Suitable Input/output or I/O devices (including but not limited to keyboards, displays, pointing devices, and the like) can be coupled to the system.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any suitable programming languages.

Computer program instructions may also be stored in a computer readable medium that can direct a system 100 or the like to function in a particular manner, such that the instructions stored in the computer readable medium produce an article of manufacture including instructions which implement the function/act specified in the flowchart and/or block diagram block or blocks.

The computer program instructions may also be loaded onto system 100 or the like to cause a series of operational steps to be performed to produce a computer implemented process such that the instructions which execute on the system 100 or the like provide processes for implementing the functions/acts specified in the flowchart and/or block diagram block or blocks.

It should be noted that any of the methods described herein can include an additional step of providing a system comprising distinct software modules embodied on a computer readable storage medium. Method steps can then be carried out or facilitated using the distinct software modules and/or sub-modules of the system, as described above, executing on one or more hardware processors 110. Further, a computer program product can include a computer-readable storage medium with code adapted to be implemented to carry out or facilitate one or more method steps described herein, including the provision of the system with the distinct software modules and/or sub-modules.

In any case, it should be understood that the components illustrated herein may be implemented in various forms. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A parallel computer system comprising:
a plurality of compute nodes, each of said compute nodes comprising:
at least one processor;
at least one memory; and
a direct memory address engine coupled to said at least one processor and said at least one memory; and
a network interconnecting said plurality of compute nodes;
wherein:
said network operates a global message-passing application for performing communications across said network;
local instances of said global message-passing application operate at each of said compute nodes to carry out local processing operations independent of processing operations carried out at another one of said compute nodes;
said direct memory address engines are configured to interact with said local instances of said global message-passing application via injection FIFO metadata describing an injection FIFO in a corresponding one of said memories;
said local instances of said global message passing application are configured to record, in said injection FIFO in said corresponding one of said memories, message descriptors associated with messages of an arbitrary communication pattern in an iteration of an executing application program; and
said local instances of said global message passing application are configured to replay said message descriptors during a subsequent iteration of said executing application program.

2. The parallel computer system of claim 1, wherein said message descriptors comprise a destination, a source, and a message intent.

3. The parallel computer system of claim 2, wherein said direct memory address engines are configured to assemble said messages in packet form by obtaining data from said memory in accordance with said message descriptors.

4. The parallel computer system of claim 1, wherein a given one of said local instances of said global message passing application records said message descriptors in response to a record command in said executing application program.

5. The parallel computer system of claim 1, wherein a given one of said local instances of said global message passing application replays said message descriptors in response to a replay command in said executing application program.

6. The parallel computer system of claim 1, wherein a given one of said local instances of said global message passing application is configured to automatically record said message descriptors by intercepting persistent application program interface calls of said executing application program.

7. The parallel computer system of claim 1, wherein said injection FIFO metadata comprises head and tail pointers to said message descriptors in said injection FIFO.

8. The parallel computer system of claim 7, wherein a given one of said local instances of said global message passing application is further configured to replay said message descriptors by resetting said head and tail pointers.

9. The parallel computer system of claim 1, wherein said message descriptors specify point-to-point communications.

10. The parallel computer system of claim 1, wherein said message descriptors specify collective communications.

11. The parallel computer system of claim 1, wherein:
said message descriptors comprise first message descriptors;
said arbitrary communication pattern comprises a first arbitrary communication pattern represented by a first persistent identifier;
said local instances of said global message passing application are further configured to record, in said injection FIFO in said corresponding one of said memories, second message descriptors associated with messages of a second arbitrary communication pattern, represented by a second persistent identifier, in another iteration of said executing application program; and
said local instances of said global message passing application are still further configured to replay said second message descriptors during another subsequent iteration of said executing application program, by resetting said injection FIFO metadata.

12. The parallel computer system of claim 11, wherein:
said local instances of said global message passing application are further configured to record, in said injection FIFO in said corresponding one of said memories, sufficient additional message descriptors associated with messages of sufficient additional arbitrary communication patterns, represented by sufficient additional persistent identifiers, in additional iterations of said executing application program, for said executing application program to implement a three dimensional fast Fourier transform operation; and
said local instances of said global message passing application are still further configured to replay said additional message descriptors during other subsequent iterations of said executing application program, by resetting said injection FIFO metadata.

13. The parallel computer system of claim 11, wherein:
said local instances of said global message passing application are further configured to record, in said injection FIFO in said corresponding one of said memories, sufficient additional message descriptors associated with messages of sufficient additional arbitrary communication patterns, represented by sufficient additional persistent identifiers, in additional iterations of said executing application program, for at least one thousand total arbitrary communication patterns; and
said local instances of said global message passing application are still further configured to replay said additional message descriptors during other subsequent iterations of said executing application program, by resetting said injection FIFO metadata.

14. A method comprising the steps of:
providing a parallel computer system comprising:
a plurality of compute nodes, each of said compute nodes comprising:
at least one processor;
at least one memory; and
a direct memory address engine coupled to said at least one processor and said at least one memory; and
a network interconnecting said plurality of compute nodes;
wherein:
said network operates a global message-passing application for performing communications across said network;
local instances of said global message-passing application operate at each of said compute nodes to carry out local processing operations independent of processing operations carried out at another one of said compute nodes; and
said direct memory address engines are configured to interact with said local instances of said global message-passing application via injection FIFO metadata describing an injection FIFO in a corresponding one of said memories;
recording, with said local instances of said global message passing application, in said injection FIFO in said corresponding one of said memories, message descriptors associated with messages of an arbitrary communication pattern in an iteration of an executing application program; and
replaying said message descriptors, with said local instances of said global message passing application, during a subsequent iteration of said executing application program.

15. The method of claim 14, wherein:
said message descriptors recorded in said recording step comprise a destination, a source, and a message intent; and
said direct memory address engines provided in said providing step are configured to assemble said messages in packet form by obtaining data from said memory in accordance with said message descriptors.

16. The method of claim 14, further comprising receiving a record command from said executing application program, wherein a given one of said local instances of said global message passing application records said message descriptors in response to said record command in said executing application program.

17. The method of claim 14, further comprising receiving a replay command from said executing application program, wherein a given one of said local instances of said global message passing application replays said message descriptors in response to said replay command in said executing application program.

18. The method of claim 14, wherein a given one of said local instances of said global message passing application records said message descriptors automatically by intercepting persistent application program interface calls of said executing application program.

19. The method of claim 14, wherein said message descriptors recorded in said recording step specify point-to-point communications.

20. The method of claim 14, wherein said message descriptors recorded in said recording step specify collective communications.

21. The method of claim 14, wherein:
said message descriptors comprise first message descriptors; and
said arbitrary communication pattern comprises a first arbitrary communication pattern represented by a first persistent identifier;

further comprising:
recording, with a given one of said local instances of said global message passing application, in said injection FIFO in said corresponding one of said memories, second message descriptors associated with messages of a second arbitrary communication pattern, represented by a second persistent identifier, in another iteration of said executing application program; and
replaying, with said given one of said local instances of said global message passing application, said second message descriptors during another subsequent iteration of said executing application program, by resetting said injection FIFO metadata.

22. The method of claim 21, further comprising:
with said local instances of said global message passing application, recording, in said injection FIFO in said corresponding one of said memories, sufficient additional message descriptors associated with messages of sufficient additional arbitrary communication patterns, represented by sufficient additional persistent identifiers, in additional iterations of said executing application program, for said executing application program to implement a three dimensional fast Fourier transform operation; and
with said local instances of said global message passing application, replaying said additional message descriptors during other subsequent iterations of said executing application program, by resetting said injection FIFO metadata.

23. The method of claim 21, further comprising:
with said local instances of said global message passing application, recording, in said injection FIFO in said corresponding one of said memories, sufficient additional message descriptors associated with messages of sufficient additional arbitrary communication patterns, represented by sufficient additional persistent identifiers, in additional iterations of said executing application program, for at least one thousand total arbitrary communication patterns; and
with said local instances of said global message passing application, replaying said additional message descriptors during other subsequent iterations of said executing application program, by resetting said injection FIFO metadata.

24. A computer program product comprising a non-transitory computer readable storage medium having computer readable program code embodied herewith, the computer readable program code comprising: computer readable program code configured to implement a global message-passing application for performing communications across the network, with local instances of said global message-passing application operating at each of the compute nodes to carry out local processing operations independent of processing operations carried out at another one of the compute nodes; computer readable program code configured to facilitate interaction between said direct memory address engines and said local instances of said global message-passing application via injection FIFO metadata describing an injection FIFO in a corresponding one of said memories; computer readable program code configured to facilitate recording message descriptors associated with messages of an arbitrary communication pattern in an iteration of an executing application program; and computer readable program code configured to facilitate replaying said message descriptors during a subsequent iteration of said executing application program.

25. An apparatus comprising:
a plurality of compute nodes, each of said compute nodes comprising:
at least one processor;
at least one memory; and
a direct memory address engine coupled to said at least one processor and said at least one memory;
means for interconnecting said plurality of compute nodes;
means for global message-passing communications across said means for interconnecting, said means for global message passing operating at each of said compute nodes to carry out local processing operations independent of processing operations carried out at another one of said compute nodes; and
means for facilitating interaction between said direct memory address engines and said means for global message-passing;
means for recording message descriptors associated with messages of an arbitrary communication pattern in an iteration of an executing application program; and
means for replaying said message descriptors during a subsequent iteration of said executing application program.

* * * * *